US005195042A

United States Patent [19]

Ferraro et al.

[11] Patent Number: 5,195,042

[45] Date of Patent: Mar. 16, 1993

[54] APPARATUS AND METHOD FOR CONTROLLING CRIMPING OF ARTICLES

[75] Inventors: Neil P. Ferraro, Merrimack; Urs F. Nager, Jr., Hudson, both of N.H.; Raymond C. Logue, Somers, N.Y.; Edward J. Chen; Patrick S. Lee, both of Poughkeepsie, N.Y.; Howard D. Delano, Kingston, N.Y.

[73] Assignee: Burndy Corporation, Norwalk, Conn.

[21] Appl. No.: 545,484

[22] Filed: Jun. 27, 1990

[51] Int. Cl.[5] ........................ G06F 15/46; H01R 43/04

[52] U.S. Cl. .................................... 364/468; 364/412; 364/476; 29/753; 29/863; 140/105; 72/10

[58] Field of Search ............... 364/468, 476, 472, 552, 364/562; 29/753, 758, 761, 282, 863; 72/10, 21, 410, 441, 453.14; 81/301, 313; 140/105, 106

[56] References Cited

U.S. PATENT DOCUMENTS

| | | | |
|---|---|---|---|
| Re. 30,001 | 5/1979 | Kindig | 29/596 |
| 1,956,778 | 5/1934 | Slagel | 251/156 |
| 2,043,453 | 6/1936 | Vickers | 137/53 |
| 2,064,445 | 12/1936 | Nilson | 254/93 |
| 2,107,970 | 2/1938 | Wells | 60/52 |
| 2,254,613 | 10/1941 | Matthysse | 140/113 |
| 2,618,929 | 11/1952 | Bidin | 60/52 |
| 2,688,231 | 9/1954 | Northcutt | 60/52 |
| 2,696,850 | 12/1954 | Peterson | 140/113 |
| 2,729,063 | 1/1956 | Hoadley | 60/52 |
| 2,821,877 | 2/1958 | Swanson | 81/15 |
| 2,869,407 | 1/1959 | Swanson | 81/15 |
| 3,030,838 | 4/1962 | Klinger | 81/15 |
| 3,091,276 | 5/1963 | Aquillon | 153/1 |
| 3,130,675 | 4/1964 | Cripe | 103/37 |
| 3,154,981 | 11/1964 | McDurmont | 81/15 |
| 3,190,319 | 6/1965 | Collins et al. | 140/105 |
| 3,258,921 | 7/1966 | Prescott | 60/52 |
| 3,289,445 | 12/1966 | Grebe et al. | 72/14 |
| 3,307,482 | 3/1967 | Lauck | 103/37 |
| 3,389,717 | 6/1968 | Povalski et al. | 137/315 |
| 3,398,567 | 8/1968 | Olsson | 72/400 |
| 3,417,599 | 12/1968 | Burns | 72/410 |
| 3,459,218 | 8/1969 | Cranage | 137/557 |
| 3,473,213 | 10/1969 | Brown | 29/203 |
| 3,627,367 | 12/1971 | Levy | 294/16 |
| 3,740,952 | 6/1973 | Fujii | 60/477 |
| 3,772,907 | 11/1973 | Rider | 72/412 |
| 3,911,717 | 10/1975 | Yuda | 72/331 |
| 3,972,218 | 8/1976 | Pawloski | 72/407 |

(List continued on next page.)

OTHER PUBLICATIONS

Advertisement "ROBO CRIMP" Huskie Tools, Inc., Oct. 1989 CEE NEWS, 3 Pages.

*Primary Examiner*—Jerry Smith
*Assistant Examiner*—Paul Gordon
*Attorney, Agent, or Firm*—Perman & Green

[57] ABSTRACT

A crimping apparatus and method for crimping electrical connectors to cables. The apparatus can automatically sense the size of a connector and can automatically determine a minimum acceptable distance of work travel in relation to the size of a connector. The apparatus can crimp articles and control the movement of an indentor by use of a computer. The apparatus can sense predetermined crimping information and at least partially record crimping information. The apparatus can determine the occurrence of a bad crimp. The apparatus can monitor predetermined characteristics of the crimper. The apparatus can sense free travel movement of an indentor and determine appropriate work travel movement of the indentor relative to sensed free travel movement. The apparatus can sense free travel movement of an indentor and compare sensed free travel movement to a stored memory of potential free travel movements and connector sizes. The apparatus can have a computer controller for, at least partially controlling a hydraulic drive system. The apparatus can have a diagnostic monitor for use in evaluating both past and present operation of the system. An apparatus is disclosed for determining indentor work travel movement of crimping apparatus and a method of controlling a system for hydraulically crimping electrical connectors is also disclosed.

30 Claims, 15 Drawing Sheets

U.S. PATENT DOCUMENTS

| | | | |
|---|---|---|---|
| 4,025,999 | 5/1977 | Wolyn et al. | 29/753 |
| 4,028,756 | 6/1977 | Cuoto | 7/5.5 |
| 4,031,613 | 6/1977 | Brown et al. | 29/628 |
| 4,031,619 | 6/1977 | Gregory | 30/180 |
| 4,109,504 | 8/1978 | Rommel | 72/407 |
| 4,110,983 | 9/1978 | Sherman | 60/477 |
| 4,132,107 | 1/1979 | Suganuma et al. | 72/416 |
| 4,136,549 | 1/1979 | Lytle et al. | 72/453.16 |
| 4,151,720 | 5/1979 | Vanderstappen | 60/479 |
| 4,226,110 | 10/1980 | Suganuma | 72/416 |
| 4,227,299 | 10/1980 | Kuehling | 29/751 |
| 4,240,280 | 12/1980 | Foslien | 72/410 |
| 4,292,833 | 10/1981 | Lapp | 72/416 |
| 4,294,006 | 10/1981 | Bair et al. | 29/701 |
| 4,313,258 | 2/1982 | Kindig et al. | 29/596 |
| 4,339,942 | 7/1982 | Svensson | 72/453.16 |
| 4,342.216 | 8/1982 | Gregory | 72/453.16 |
| 4,356,501 | 12/1982 | Potts | 72/416 |
| 4,366,673 | 1/1983 | Lapp | 60/477 |
| 4,400,873 | 8/1983 | Kindig et al. | 29/753 |
| 4,478,479 | 10/1984 | Cherry et al. | 339/273 R |
| 4,581,894 | 4/1986 | Bush et al. | 60/482 |
| 4,587,725 | 5/1986 | Ogawa et al. | 29/753 |
| 4,589,272 | 5/1986 | Hutson | 72/453.16 |
| 4,604,890 | 8/1986 | Martin | 72/453.16 |
| 4,640,117 | 2/1987 | Anderson et al. | 72/410 |
| 4,667,502 | 5/1987 | Bush et al. | 72/453.16 |
| 4,671,063 | 6/1987 | Anaker | 60/458 |
| 4,723,434 | 2/1988 | Bush | 72/410 |
| 4,796,461 | 1/1989 | Mead | 72/453.16 |
| 4,856,186 | 8/1989 | Yeomans | 29/863 |
| 4,914,941 | 4/1990 | Ijiri et al. | 72/449 |
| 4,916,810 | 4/1990 | Yeomans | 29/863 |
| 5,046,241 | 9/1991 | Ricard | 29/863 |

FIG. 5.
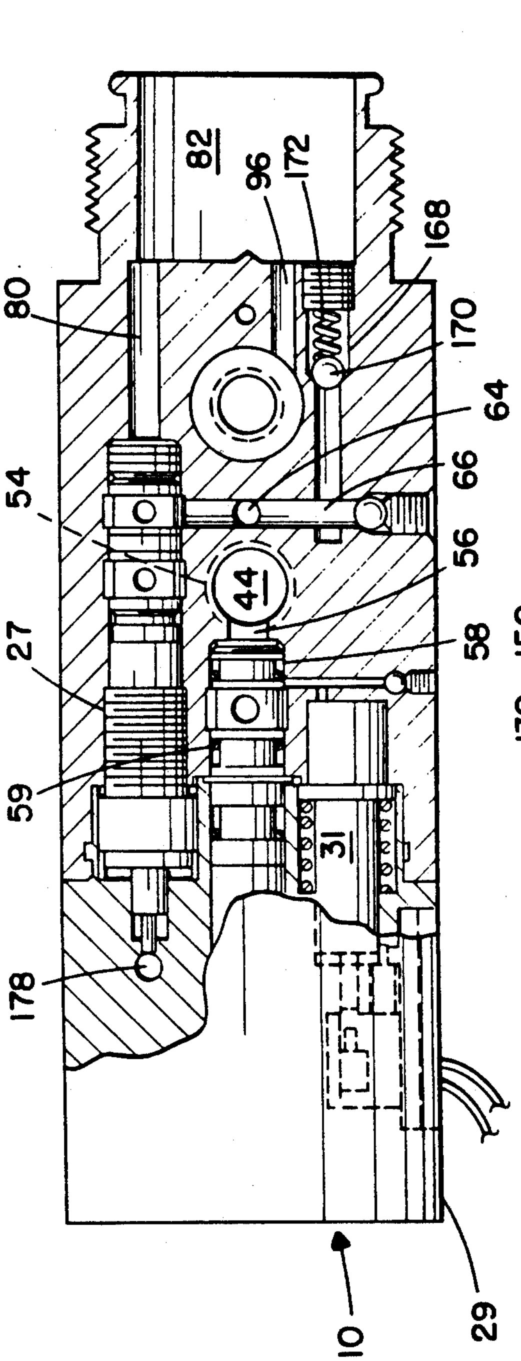
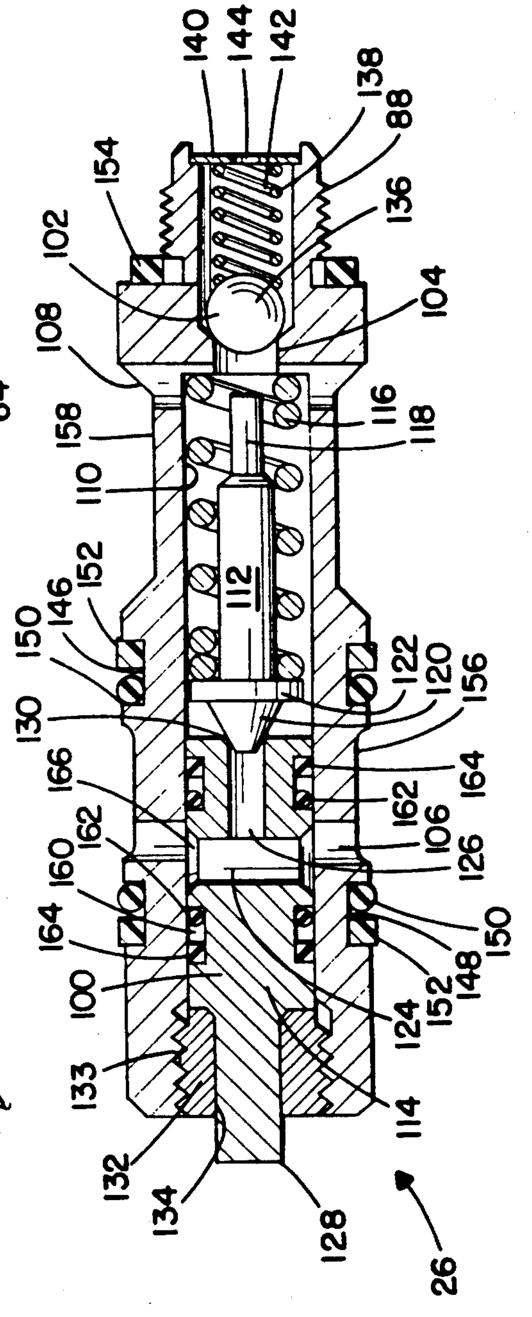
FIG. 4A.

CONNECTOR O.D. INCHES

—•— — Cu CONN / HD Cu COND.

+ Al CONN / SD Al COND.

APPARATUS AND METHOD FOR CONTROLLING CRIMPING OF ARTICLES

BACKGROUND OF THE INVENTION

1. Field of The Invention

The present invention relates to compressing articles and, more particularly, to an apparatus and method for controlling crimping of articles.

2. Prior Art

Various different systems and methods for compressing and crimping articles are known in the art. U.S. Pat. No. 4,294,006 to Bair et al. discloses a bench mounted microprocessor controlled crimping apparatus. The microprocessor can control a crimping station in accordance with instructions input into a control console. U.S. Pat. No. 4,796,461 to Mead discloses a hand-operated hydraulic crimping tool having a piston follower mechanism to provide an automatically sequentially reduced crimping force in dependence upon the extent of ram movement. U.S. Pat. No. 4,604,890 to Martin discloses a fluid pressure control means for preselecting and presetting the maximum pressure of the fluid supplied for controlling the maximum force applied by a drive means. U.S. Pat. No 4,240,280 to Foslien discloses a crimper with a signal mechanism to produce a sensory perception to the user of the completion o a predetermined crimping movement of its jaws. U.S. Pat. No. 3,972,218 to Pawloski discloses a crimping tool which prohibits the tool from completing its cycle of operation if the pressure of fluid falls below a pressure sufficient to effect a desired crimp. U.S. Pat. No. 4,342,216 to Gregory discloses a means for opening a check valve upon the piston by moving a predetermined distance.

Problems exist with the apparatus and methods of controlling crimping of articles known in the prior art. No apparatus or method is provided for automatically sensing the size of an article to be crimped. No apparatus or method is provided for automatically determining ram travel in relation to article size. No apparatus or method is provided for computer control in a hand-held and hand-operated crimping tool. No apparatus or method is provided for recording crimp information in a hand-held and hand-operated crimping tool. No apparatus or method is provided for signaling the completion of a good crimp or the occurrence of a bad crimp. No apparatus or method is provided for monitoring preselected characteristics of a hand-held and hand-operated crimping tool.

It is therefore the objective of the present invention to provide new and improved apparatus and methods for controlling the crimping of articles that can overcome the above problems as well as provide additional features.

SUMMARY OF THE INVENTION

The foregoing problems are overcome and other advantages are provided by an apparatus and method for determining, monitoring, and/or controlling an indentor's travel and/or other predetermined characteristics or features in a compression apparatus.

In accordance with one embodiment of the invention, an apparatus for crimping an article is provided. The apparatus has a frame, a moveable indentor, and means for moving the indentor. The apparatus further comprises means for sensing the location of the inventor relative to the frame; means for automatically determining a range of movement of the indentor for producing a good crimp, the determination being dependent, at least partially, upon the size of an article to be crimped; and means for preventing further advancement of the indentor upon the occurrence of the indentor reaching an end of the range.

In accordance with another embodiment of the present invention an apparatus for crimping an article is provided. The apparatus has a frame, a moveable indentor, means for moving the indentor including a hydraulic system, and an indentor movement control. The control comprises means for sensing the location of the indentor; means for automatically determining a minimum distance of indentor movement for producing a good crimp, the determination being dependent, at least partially, upon the size of an article to be crimped; means for sensing hydraulic pressure in the hydraulic system; and means for preventing further advancement of the indentor upon the incurrence of a predetermined hydraulic system pressure before the occurence of the indentor reaching the minimum distance of indentor movement.

In accordance with another embodiment of the invention an apparatus for crimping an article is provided comprising means for crimping, means for preventing further advancement, and means for resetting. The means for crimping includes a moveable indentor advanceable towards an article from a retracted home position. The means for preventing further advancement can prevent further advancement of the indentor upon occurrence of a predetermined condition. The means for resetting can reset the means for crimping after the occurrence, the means for resetting being activated by substantially full retraction of the indentor to its home position.

In accordance with another embodiment of the present invention an apparatus for crimping an article is provided comprising means for crimping and a hydraulic system pressure safety system. The means for crimping has a moveable indentor, a hydraulic system, and two handles for pumping the hydraulic system. The hydraulic system pressure safety system has at least two means for relieving hydrualic system pressure, a first means for relieving hydraulic system pressure comprising a computer and a deactivation valve, and a second means for releiving hydraulic system pressure comprising a mechanical relieve valve.

In accordance with another embodiment of the present invention an apparatus for crimping an article is provided comprising means for crimping, and means for relieving hydraulic fluid. The means for crimping has a moveable inventor, a hydraulic system, and two handles moveable relative to each other for hydraulically moving the indentor. The means for relieving hydraulic fluid can remove hydraulic fluid from the hydraulic system upon the occurrence of a predetermined hydraulic system pressure, the means for relieving comprising a computer and a computer controlled hydraulic system deactivation valve.

In accordance with another embodiment of the present invention, an apparatus for crimping an article is provided. The apparatus has a frame, a moveable indentor, means for moving the indentor, and an indentor travel controller. The controller comprises means for sensing the location of the indentor relative to the frame; means for sensing free travel movement of the indentor; means for automatically determining length of work travel movement of the indentor relative to sensed free travel movement; and means for preventing further advancement of the indentor upon the occurrence of the indentor reaching an end of the length of work travel movement.

In accordance with another embodiment of the present invention an apparatus for crimping an article is provided having a frame, a moveable indentor, means for moving the indentor including a hydraulic system and an indentor movement control. The control comprises means for automatically determining the bad crimp including means for sensing the location of the inventor and means for sensing hydraulic pressure in the hydraulic system; and means for preventing further advancement of the indentor upon the occurrence of a predetermined hydraulic system pressure before the occurence of movement of the indentor to a predetermined location.

In accordance with one method of the invention, a method of controlling crimping of an article is provided comprising the steps of determining the range of movement of an indentor to produce a good crimp for an article including sensing movement of the indentor; and preventing further advancement of the indentor upon the occurrence of the indentor reaching an end of the determined range.

In accordance with another method of the present invention a method of controlling crimping of an article is provided comprising the steps of sensing the location of an indentor; sensing hydraulic pressure in a hydraulic drive system for moving the indentor; determining deactivation parameters for preventing further crimping by the indentor including a deactivation location of the indentor and a deactivation pressure in the hydraulic drive system; and activating a deactivation valve to prevent further advancement of the indentor upon the occurrence of the indentor reaching the deactivation location and the hydraulic system reaching the deactivation pressure.

BRIEF DESCRIPTION OF THE DRAWINGS

The foregoing aspects and other features of the invention are explained in the following description, taken in connection with the accompanying drawings, wherein:

FIG. 4A is an enlarged cross-sectional view of the relief/release valve shown in FIG. 4.

FIG. 5 is a partial cross-sectional view of the body section of the tool shown in FIG. 1.

DETAILED DESCRIPTION OF THE INVENTION

Figure 1:
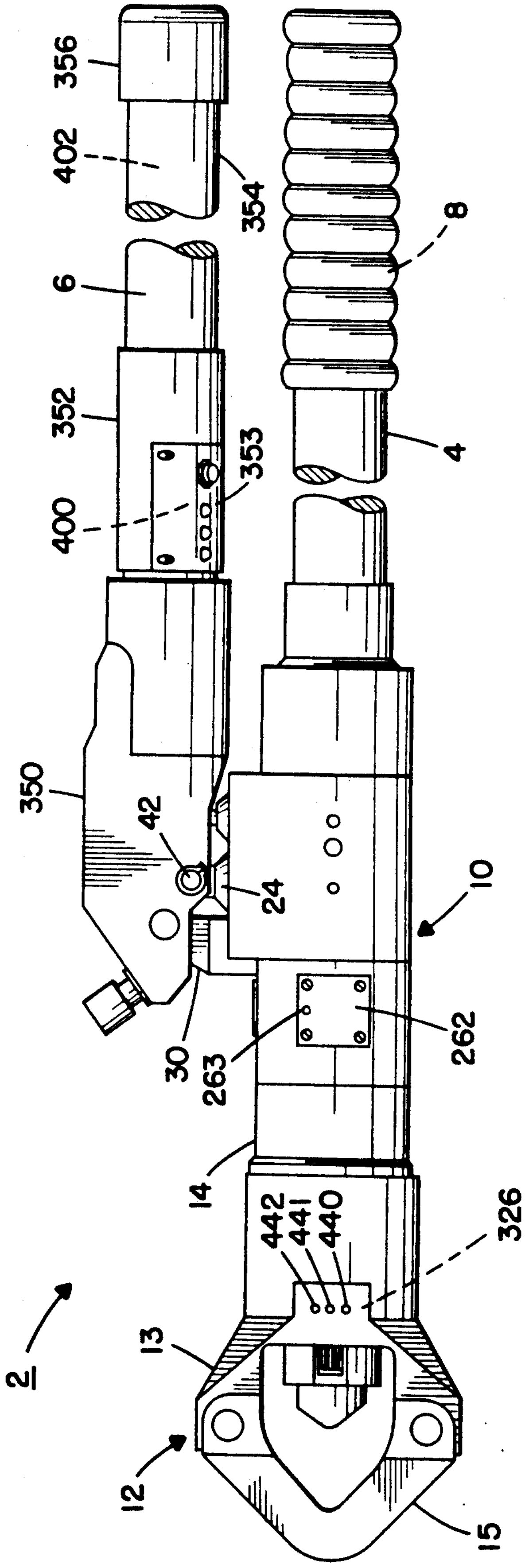
FIG. 1 is a plan side view of a hand-held and hand-operated hydraulic crimper incorporating features of the present invention.

Referring to FIG. 1, there is shown a plan side view of a hydraulic compression tool 2 incorporating features of the present invention. The tool 2 generally comprises a first handle 4 having a fluid reservoir 8 therein, a second handle 6, a body section 10 and a compression head section 12. The reservoir 8 is generally capable of holding a supply of hydraulic fluid, such as oil, and capable of supplying the fluid to the body section 10. In the embodiment shown, the reservoir 8 is partially formed from a portion of the body section 10. The second handle 6 is pivotally mounted to the body section 10 for operating a hydraulic pump 24. Although the present invention is being described with reference to the embodiment shown in FIG. 1, it should be understood that the invention may be incorporated into many alternate forms of compression tools including bench mounted tools, non-hydraulically operated tools, fully automatic tools, non-hand-operated tools, etc. In addition, any suitable size, shape, or type of materials can be used for elements of the tool. Any suitable means for connecting elements and sealing contacts can also be provided.

Figure 2:
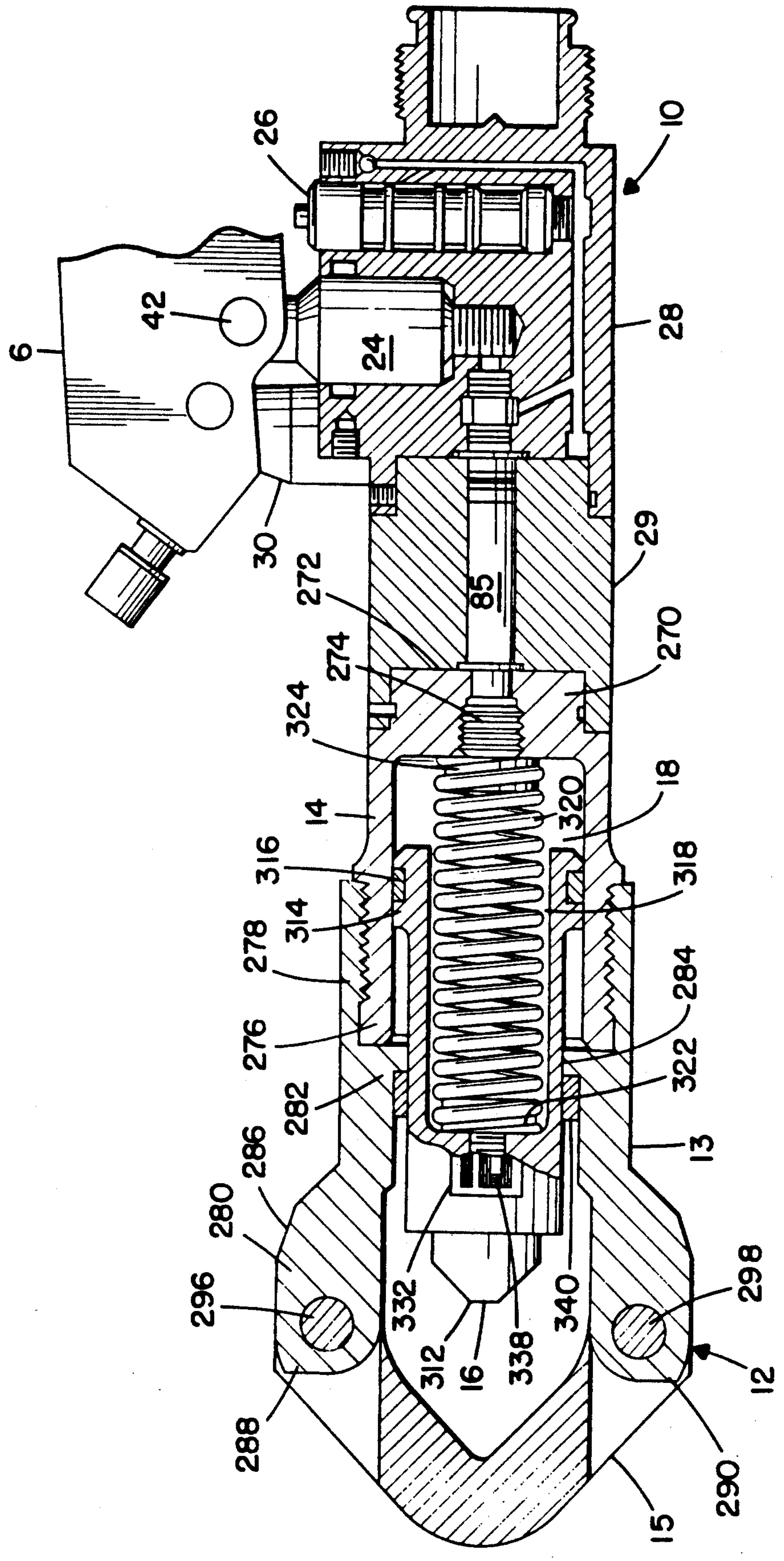
FIG. 2 is a partial cross-sectional view of the body section and head section of the crimper shown in FIG. 1.

Referring also to FIG. 2 a partial cross-sectional view of the body section 10 and head section 12 of the tool 2 of FIG. 1 is shown. The compression head section 12 generally comprised a frame 13 having a cylinder body 14 with a hydraulic cylinder 18 therein, an anvil support member or frame 280, and a clamping section or anvil 15. The compression head section 12 also generally comprises a ram or indentor 16 movably mounted, at least partially, in the cylinder 18, and a ram position sensor 326 (see FIG. 1). The indentor 16 and the anvil 15 are for compressing articles therebetween such as metal connector about elements, such as wires, to be connected. In the embodiment shown, the anvil 15 and ram 16 are of a dieless design; i.e.: no crimping dies are required. However, suitable means may be provided to use crimping dies with the tool 2. The entire head section and its functions and operation will be described in more detail below.

Figure 3:
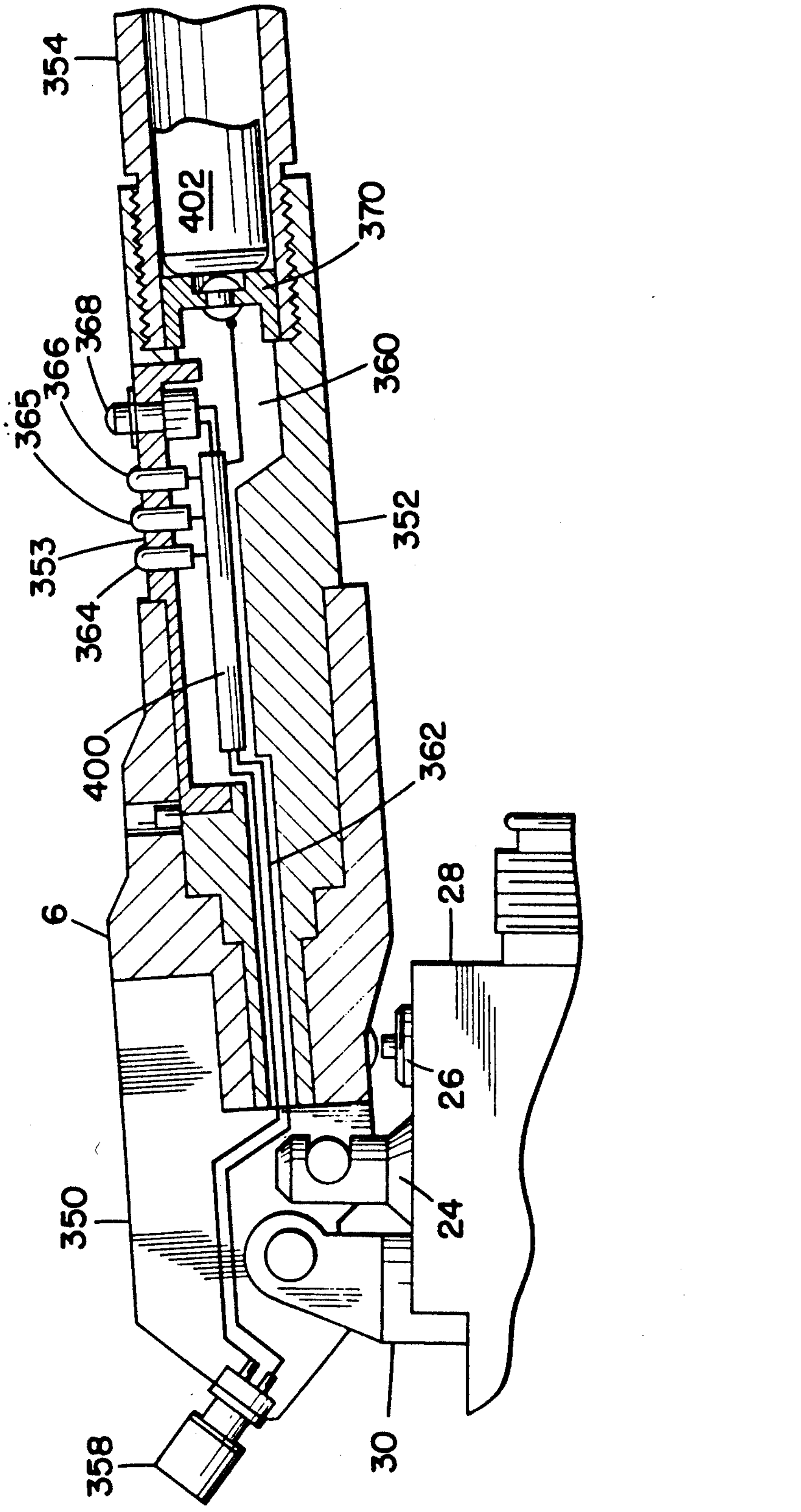
FIG. 3 is a partial cross-sectional view of a portion of the movable handle of the crimper shown in FIG. 1.
Figure 4:
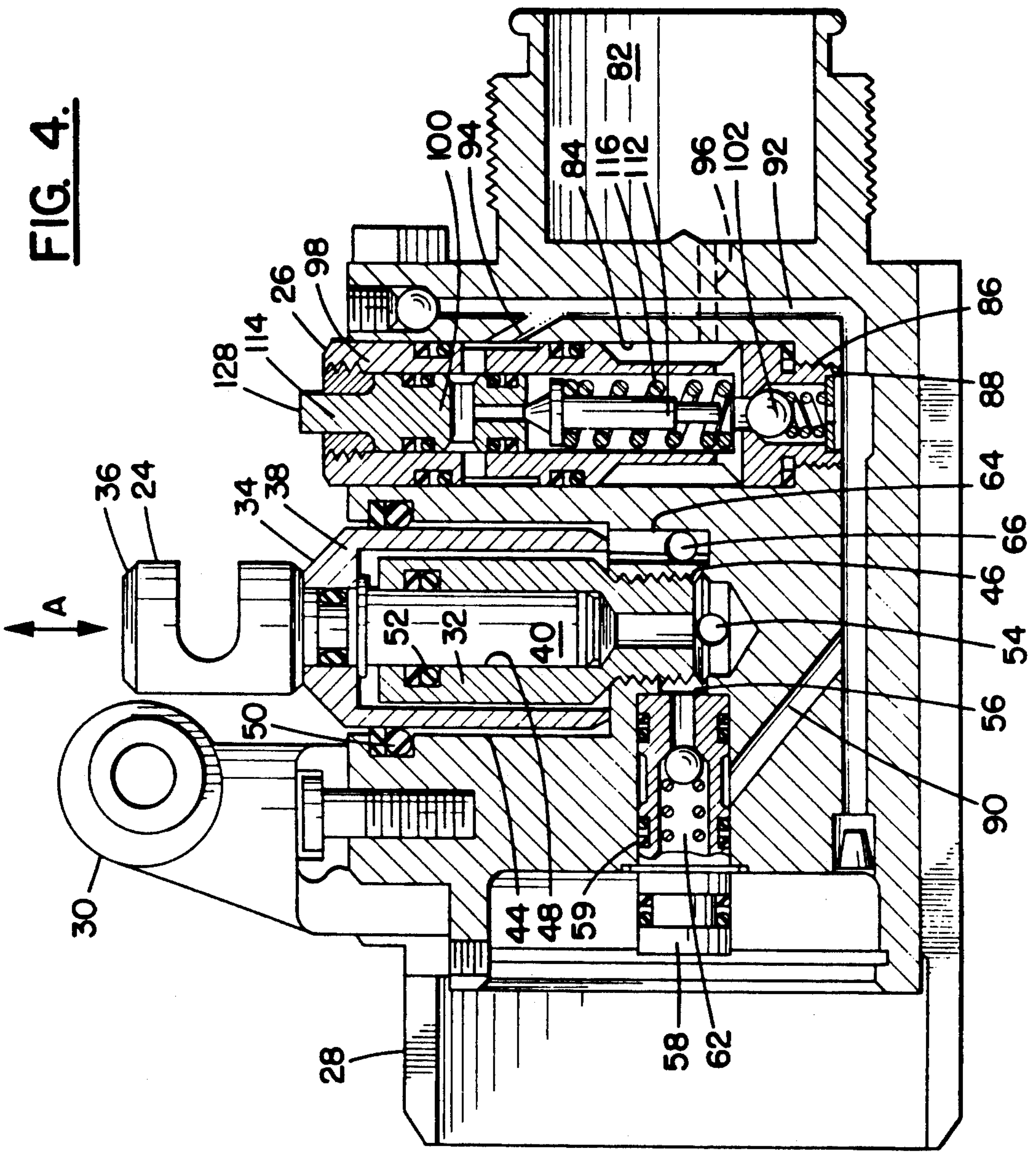
FIG. 4 is an enlarged cross-sectional view of the pump body of the tool shown in FIG. 1.

Referring also to FIGS. 4, 4A, and 5, the body section 10 of the tool 2 will be further described. The body section 10 generally comprises, in the embodiment shown, a pump body or frame 28, a module block 29, a hydraulic pump 24, a relief/release valve 26, a deactivation valve assembly 27, a pressure sensor 31 and a plurality of conduits forming a hydraulic fluid supply conduit system and a hydraulic fluid return conduit system as will be described below. As stated above, the handles 4 and 6 can be manipulated to operate the hydraulic pump 24 for providing fluid from the fluid reservoir 8 to the cylinder 18 and thereby provide hydraulic pressure for advancing the ram 16 towards the anvil 15. In the embodiment shown, the tool 2 comprises a combined hydraulic relief/release valve 26 as disclosed in copending patent application Ser. No. 07/332,839 filed Apr. 3, 1989 entitled "Hydraulic Compression Tool Having An Improved Relief and Release Valve" assigned to the same assignee as herein which is incorporated by reference in its entirety herein. In an alternate embodiment of the invention, the ram 16 may be advanced without pumping the second handle 6, simply by rotating the first handle 4 as is known in the art. As shown best in FIG. 3, the second handle 6 is fixedly, but pivotally connected to the body section 10 for operating the hydraulic pump 24 when the two handles 4 and 6 are moved relative to each other. In the embodiment shown, the second handle 6 generally comprises a frame that houses a controller 400 comprising a computer 404, a power source 402 and a control and signal console 353. The controller 400, in the embodiment shown, is generally capable of, at least partially, controlling the operation of the deactivation valve assembly 27. In addition, the controller 400 has many other features including, some in combination with other features of the tool. In the embodiment shown, the controller 400 can determine the size of the connector, can determine ram travel to produce a crimp of a connector with predetermined characteristics, can at least partially control movement of the ram through the use of the deactivation valve assembly 27, can determine predetermined crimping information from sensed information, can record crimp information, can determine the occurrence of good crimps, can determine the occurrence of bad crimps, can monitor predetermined characteristics of the tool 2 through the use of sensors, can calculate free travel movement of the ram, can determine work travel movement of the ram, and can recognize ram contact with a connector through the use of sensors. The above list of features is not intended to be exhaustive, but merely indicative of some features of the tool 2. In alternative embodiments, not all of these features need be provided. Alternatively, additional features may be provided. All of these elements will be described in further detail below.

Fixedly mounted to the pump frame 28 is a pivot arm 30 which is provided for connecting the second handle 6 to the body section 10. In the embodiment shown, the hydraulic pump 24 is a coaxial pump capable of low volume high pressure operation and high volume low pressure operation. The pump 24 is suitably mounted in the frame 28 and, as best shown in FIG. 4, generally comprising a stationary portion 32 and a movable portion 34. The movable portion 34 generally comprises a top latch 36, an outer sleeve 38 and an inner piston 40. In a preferred embodiment of the invention the top latch 36 and inner piston 40 are formed as one piece. The top latch 36 can be pivotally connected to a pin 42 on the second handle 6 (see FIG. 2) such that movement of the second handle 6 can move the movable portion 34 relative to the pump frame 28 and stationary portion 32 as indicated by arrow A in FIG. 4. The hydraulic pump 24 is suitably received in the frame 28 at a pump aperture 44 in the frame 28. The stationary portion 32, in the embodiment shown, generally comprises a threaded section 46 for mounting the pump 24 in a threaded section of the pump aperture 44. The stationary portion 32 also has a central aperture 48 for movement of the inner piston 40 therein. Suitable seals 50 and 52, such as O-rings are provided with the pump 24 to seal the movable portion 34 with the frame 28 and the inner piston 40 with the stationary portion 32, respectively. The portion of the fluid supply conduit system that can supply fluid from the reservoir 8 to the pump 24 generally comprises conduit 80, portions of the deactivation valve assembly 27, conduit 66, conduit 64, and conduit 54. The fluid inlet conduit 54 to the inner piston 40 communicates with the pump aperture 48 at the base of the stationary portion 32 for providing fluid to the pump. Movement of the second handle 6 away from the first handle 4 will cause the movable portion 34 to move outwardly from the frame 28 as indicated by arrow A with the piston 40 creating a vacuum in the central aperture 48 of the stationary portion 32. This vacuum will draw fluid into the central aperture 48 via the conduit 54. Movement of the second handle 6 back towards the first handle 4 will cause the movable portion 34 of the pump 24 to move back towards a home position as shown in FIG. 4. During this return movement, the inner piston 40 can then pump the fluid contained in the central aperture 48 out a conduit 56 past a directional flow check valve 58, through the module block 29, and into the cylinder 18. Suitable means are provided to prevent the fluid from exiting the inlet conduit 54 in a reverse direction, except when desired, as will be described below. The check valve 58 between the pump body 28 and module block 29 generally comprises a ball biased against an aperture by a spring. This configuration allows fluid pressure in the conduit 56 to displace the ball from its seat by compressing its spring and flow past the check valve 58. However, this type of ball and spring check valve prevents fluid in the cylinder 18 from reentering the pump 24. When fluid is not being passed through the check valve 58 from the pump 24, the spring at the check valve 58 biases its ball against its seat as shown. Thus, the ball substantially blocks reverse flow of fluid from the cylinder 18 into the conduit 56. A channel 64 in the frame 28 provides a path for fluid to flow from a conduit 66 into the pump aperture 44 proximate the outer sleeve 38. The supplying or pumping of fluid by the inner piston 40 generally supplies fluid to the cylinder 18 at a relatively low volume rate when used alone. However, in the embodiment shown, the outer sleeve 38 can also act as a piston to deliver fluid to the cylinder 18. Movement of the second handle 6 away from the first handle 4 causes the outer sleeve 38 to create a vacuum in the pump aperture 44 surrounding the stationary portion 32. This vacuum can draw fluid into the aperture 44 via the conduits 64 and 66. Movement of the second handle 6 back towards the first handle 4 will cause the outer sleeve 38 to pump fluid back out the conduits 64 and 66 through the deactivation valve assembly 27 (see FIG. 5), through conduits 54 and 56, through check valve 58 and into the module block 29 and cylinder 18. The dual action of the inner piston 40 and outer sleeve 38 allows the ram 16 to be advanced relatively quickly with a minimum number of pumps of the handles. Thus, when both the inner piston 40 and outer sleeve 38 deliver fluid to the cylinder 18, the fluid is delivered at a relatively high volume rate, but only for low pressures because the outer sleeve 38 is not always capable of delivering fluid in conjunction with the action of the inner piston 40 to the cylinder 18. When the ram 16 contacts an article to be compressed, a relief valve 168 having a ball 170 and spring 172 (see FIG. 5) can deactivate or neutralize the pumping action of the outer sleeve 38. Generally, when the ram 16 contacts an article and clamps the article against the anvil 15, the ram 16 meets resistance to further advancement. When the ram 16 meets resistance to further advancement, fluid pressure in the cylinder 18 increases and can become greater than the pressure required to open the relief valve 168. The deactivation valve assembly 27 can prevent fluid in the low volume high pressure area of the pump from flowing through the relief valve 168. However, the conduit system in the pump body 28 provides a free path from the aperture 44 proximate the outer sleeve 38 to the valve 168 and thereby allows fluid sucked into the aperture 44 by the outer sleeve to exit the body section 10 via the relief valve 168. The transitional pumping operation from a high volume low pressure action to a low volume high pressure action of the pump 24 allows an operator to advance the ram 16 relatively quickly by use of both the inner piston 40 and outer sleeve 38 to advance the ram 16 from a home position to a connector contact position, but which nonetheless allows the operator to compress an article relatively easily without substantial effort by use of only the inner piston 40 and low volume high pressure area when actually compressing an article. Thus, the ram 16 can advance quickly through the use of the pumping action of both the piston 40 and outer sleeve 38 and the ram 16 can compress an article relatively effortlessly by limiting use of the pumping action to only the inner piston 40 to compress an article. However, it should be understood that the present invention can be used with any suitable type of pump including an electric pump. In addition, features of the present invention can be used with non-hydraulically operated tools.

With particular reference to FIGS. 4, 4A and 5, in the embodiment shown, the pump body 28 also comprises a valve receiving aperture 84 for mounting the relief/release valve 26. The valve receiving aperture 84 comprises a threaded section 86 for receiving a threaded section 88 of the valve 26. The frame 28 also comprises a system of conduits for returning fluid from the cylinder 18 through the valve 26 into the fluid reservoir 8. The fluid return conduit system in the pump body 28 generally comprises a first return conduit 90, a second return conduit 92, a third return conduit 94, and a fourth return conduit 96. The first conduit 90 generally communicates with the check valve receiving aperture 59 and check valve 58 behind its ball such that the first conduit 90 communicates with a center conduit 85 of the module block 29 which in turn communicates with the cylinder 18. The first conduit 90 also communicates with the second conduit 92. The second conduit 92 generally communicates with the valve receiving aperture 84 via the opening at the threaded section 86 and also communicates with the aperture 84 via the third conduit 94. The fourth conduit 96 generally communicates between the valve receiving aperture 84 and the reservoir portion 82 of the pump body 28. Thus, fluid from the cylinder 18 can pass through the module block conduit 85, first conduit 90, second conduit 92, eventually into the valve 26 and out the fourth conduit 96 back into the fluid reservoir 8.

As shown best in FIG. 4A, the relief/release valve 26, in the embodiment shown, generally comprises a frame 98, a plunger assembly 100 and a first gate 102. The frame 98 generally comprises a first inlet aperture 104, second inlet apertures 106, outlet apertures 108 and a central chamber or conduit 110. The frame 98 can be made of any suitable material such as stainless steel. In the embodiment shown, the frame 98 is generally column shaped with two circular seal seats 146 and 148. Each seat has an O-ring seal 150 and a back-up ring 152 to prevent the O-rings 150 from being extruded under pressure. The seals 150 are generally capable of making a sealing engagement between the frame 98 of the valve 26 and the pump body 28 in the valve receiving aperture 84. The seals 150 and back-up rings 152 can generally be removed from the pump body 28 with the valve 26 when the valve 26 is removed. The frame 98 also has a threaded section 88 for mounting the valve 26 with the threaded hole 86 in the body frame 28. A seal 154 is provided to seal the valve frame 98 with the body frame 28 proximate the hole 86. The valve frame 98 also has a threaded portion 133 at an opposite end of the frame 98 in the central chamber 110. The first inlet aperture 104 is generally a circular hole with an enlarged section 142 passing through the frame 98 and a relatively narrow section proximate the central chamber 110. The second inlet apertures 106 generally comprises two circular holes that pass through the frame 98 into the central chamber 110. A first circular ring shaped depression 156 extends around the outside of the valve frame 98 proximate the second inlet apertures 106. The outlet apertures 108 generally comprises two circular holes that pass through the frame 98 into the central chamber 110 proximate the first inlet aperture 104. A second circular ring shaped depression 158 extends around the outside of the valve frame 98 proximate the outlet apertures 108. The first circular ring shaped depression 156 allows the valve 26 to be inserted into the valve receiving aperture 84 without the need for precisely aligning the second inlet apertures 104 with the third return conduit 94. The second circular ring shaped depression 158 allows the valve 26 to be inserted into the valve receiving aperture 84 without the need for precisely aligning the outlet apertures 108 with the fourth return conduit 96.

The plunger assembly 100 generally comprises a first plunger member 112, a second plunger member 114 and a spring 116. The first plunger member 112 generally comprises a first end 118 located proximate the first gate 102, a second end 120 located proximate the second plunger member 114 and a ledge portion 122. The second end 120 generally has a cone-like shape for reasons as will be described below. The spring 116, at the home position shown, is slightly compressed between a portion of the frame 98 and the ledge portion 122 of the first plunger member with a portion of the first plunger member 112 passing through the coiled spring 116. In the home position shown the first end 11B of the first plunger member 112 is spaced slightly from the first gate 102. The second plunger member 114 generally comprises a first conduit 124, a second conduit 126 and an extension 128. The second plunger member 114 also comprises two circular seal depressions 160 for housing two O-ring seals 162 and cooperating back-up rings 164. The seals 160 can provide sealing engagement between the second plunger member 114 and the interior walls of the frame central chamber 110. The second plunger member 114 also comprises a circular ring shaped depression 166 around the outside of the second plunger member 114 proximate the first conduit 124. The first conduit 124 generally communicates with the second inlet apertures 106 of the frame 98. The second plunger member ring shaped depression 166 allows the first conduit 124 to communicate with the second inlet apertures 106 without the need for precise alignment. In addition, the ring shaped depression 166 is relatively large to provide communication between the second plunger member first conduit 124 even when the second plunger member 114 is moved from its home position to a release position as will be described below. The second conduit 126 generally communicates between the first conduit 124 and, in the home position shown, terminates in the central chamber 110 at the second end 120 of the first plunger member 112. The second conduit 126 generally has an aperture 130 in which a portion of the second end 120 of the first plunger member 112 sits therein at the home position. The second plunger member extension 128 generally extends past the end of the valve frame 98 and is intended to be used as a button for manual release of hydraulic fluid. Both the first plunger member 112 and the second plunger member 114 are movably mounted in the central chamber 110 of the frame 98. The spring 116 generally biases the first plunger member 112 against the second plunger member 114. A threaded nut 132 is mounted at the threaded portion 133 of the frame and has an aperture 134 to allow the extension 128 to pass therethrough. The threaded nut 132, in addition to allowing the extension 128 to extend through its aperture 134, generally provides a barrier to contain the first plunger member 112, the second plunger member 114 and the spring 116 in the central chamber 110 of the valve. In addition, the threaded nut 132 cooperates with the first plunger member 112 and the second plunger member 114 such that the spring 116 is slightly compressed or preloaded at the home position shown.

The first gate 102, in the embodiment shown, generally comprises a ball 136, a spring 138 and a retaining washer 140 contained in the enlarged section 142 at the first inlet aperture 104. The washer 140, in the embodiment shown, has a central aperture 144 for passage of fluid therethrough. The spring 138 is slightly compressed or preloaded between the washer 140 and the ball 136 to bias the ball 136 against the first inlet aperture 104 such that fluid is prevented from entering the central chamber 110 through the first inlet aperture 10 in the home position.

The relief/release valve 26, in the embodiment shown, generally has two positions other than the home position; a manual fluid release position and an automatic fluid relief position. In the manual release position the extension 128 is manually depressed by an operator thereby moving the first plunger member 112 and second plunger member 114 towards the first gate 102 by compressing the spring 116. Any suitable means can be used to depress the extension 128 such as a depress lever on the second handle 6. In the manual release position, the first end 118 of the first plunger member 112 generally projects into the first inlet aperture 104 to displace the ball 136 from its seat at the first inlet aperture 104. With the ball 136 displaced from its seat against the first inlet aperture 104, the first gate 102 is in an open position such that fluid from the second return conduit 92 can pass through the washer aperture 144, through the enlarged portion 142, through the first inlet aperture 104, into the central chamber 110 and out the outlet apertures 108 to return fluid via the fourth return conduit 96 back to the fluid reservoir 8. If the force against the extension 128 is removed, the spring 116 is able to bias the first plunger member 112 and the second plunger member 114 back to the home position. With the first end 118 of the first plunger member 112 being removed from the first inlet aperture 104, the spring 138 of the first gate 102 can bias the ball 136 back into its seat against the first inlet aperture 104, to prevent fluid from flowing therethrough as shown in the home position. The manual release operation of the valve 26 allows the valve 26 to cooperate with the fluid return conduits to allow fluid in the cylinder 18 to flow back into the fluid reservoir 8 thereby allowing the ram 16 to be retracted to increase the distance between the ram 16 and anvil 15 and thereby open the compression head section 12 for removal of a compressed item or placement of an item to be compressed into the area between the ram 16 and anvil 15.

The fluid relief position for the valve 26 is generally provided for limiting the maximum pressure applied to an item to be compressed, such as a connector, to a preselected maximum pressure. Thus, the valve 26 is capable of automatically regulating fluid pressure to prevent damage to an item to be compressed and damage to the tool 2. The relief position is thus depended upon fluid pressure in the cylinder 18. Because the first, second and third return conduits 90, 92 and 94 communicate with the cylinder 18 via the module block conduit 85, the fluid pressure in the first, second and third return conduits 90, 92 and 94 is substantially the same as fluid pressure in the cylinder 18. When a predetermined maximum pressure, such as about 11,000 psi, is reached the valve 26 automatically allows fluid to flow into the valve and out the outlet apertures 108 until the fluid pressure at the cylinder 18 diminishes below the predetermined maximum pressure at which point the valve 26 will close to prevent additional fluid from automatically flowing therethrough. As described above, the third return conduit 94 communicates with the second inlet apertures 106 of the valve which in turn communicates with the first and second conduits 124 and 126 of the second plunger member 114. The first plunger member 112 has a cone shaped second end 120 which, due to the biasing action of the spring 116, is biased in the aperture 130 of the second conduit 126 at the home position shown in FIG. 4A. When the predetermined maximum pressure is exceeded, fluid in the first and second conduits 124 and 126 of the second plunger member 114 presses against the cone shaped portion of the first plunger member second end 120 to move the first plunger member 112 away from the second plunger member 114 to open a gate at the second conduit aperture 130 to allow fluid to flow from the third return conduit 94 into the second inlet apertures 106 through the second plunger member first and second conduits 124 and 126, into the central chamber 110 of the valve and finally out the outlet apertures 108 into the forth return conduit 96 to the fluid reservoir 8. When sufficient fluid has flowed through this relief operation through the valve 26, and pressure is reduced, the spring 116 is once again able to bias the first plunger member 112 against the second plunger member 114 with the cone shaped second end 120 returning to its seat at the aperture 130 to close the second gate, formed between the first and second plunger members, and thereby return the valve 26 to the home position shown.

The relief/release valve 26 obviously has many advantages over the devices in the prior art. The valve 26 provides a valve for both manual release of fluid pressure as well as automatic fluid pressure relief. The combined relief/release valve 26 has less parts than the two separate valves that were needed in devices of the prior art. In addition, the relief/release valve is relatively easy to replace, easy to manufacture, self-contained and simpler in construction than the separate relief valves and release valves known in the prior art. In addition, unlike prior art devices which required the removal of fluid from a compression tool when a relief valve is removed or replaced and subsequently the prior art tool had to be bleed to remove air in the hydraulic system when the fluid was replaced, the present relief/release valve allows for a relatively simple and easy replacement or removal of the relief/release valve without the need for removing the fluid from the hydraulic system and bleeding the system, thus greatly easing repair and service to a compression tool. In addition, unlike multiple valves in prior art devices, the relief/release valve allows for repair or replacement of all seals at one time. In alternate embodiments, any suitable supply conduit system and return conduit system may be provided. Any suitable type of gates may be provided at the first and second gates to the relief/release valve 26. Any suitable directional flow valves or check valves may also be used. In an alternate embodiment of the present invention, the relief/release valve 26 need not be provided.

Alternatively, a mere manual release valve may be provided and/or a separate relief valve.

Figure 6:
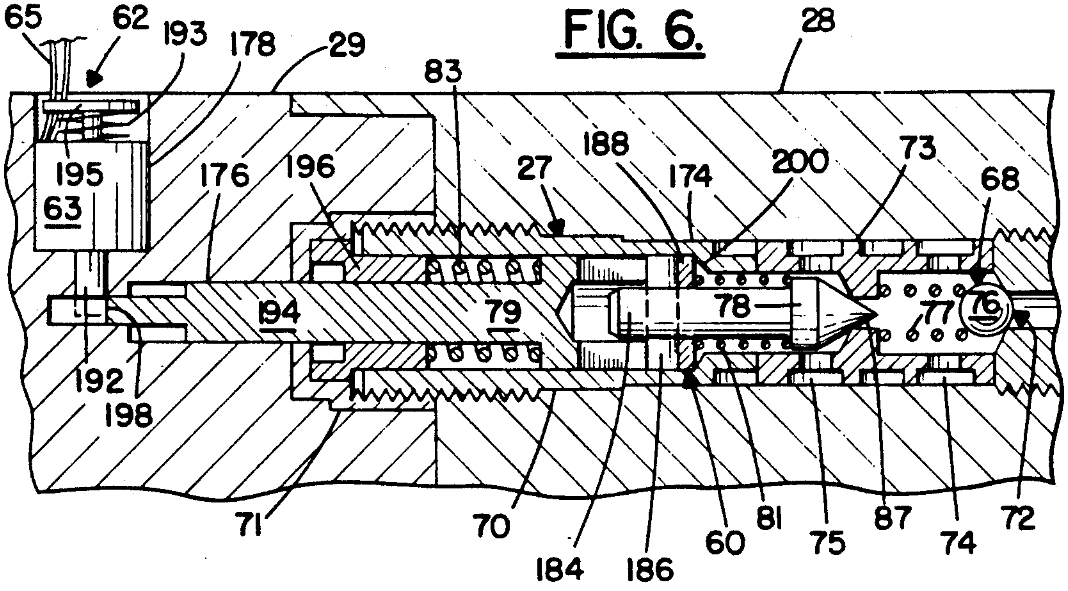
FIG. 6 is a cross-sectional view of the deactivation valve assembly of the tool shown in FIG. 1 in a first position.
Figure 6A:
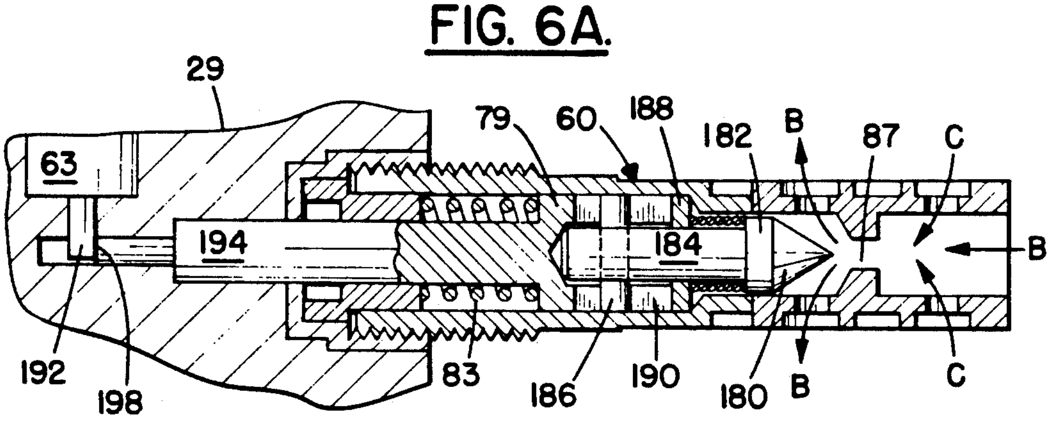
FIG. 6A is a cross-sectional view of the deactivation valve assembly in a second position.
Figure 6B:
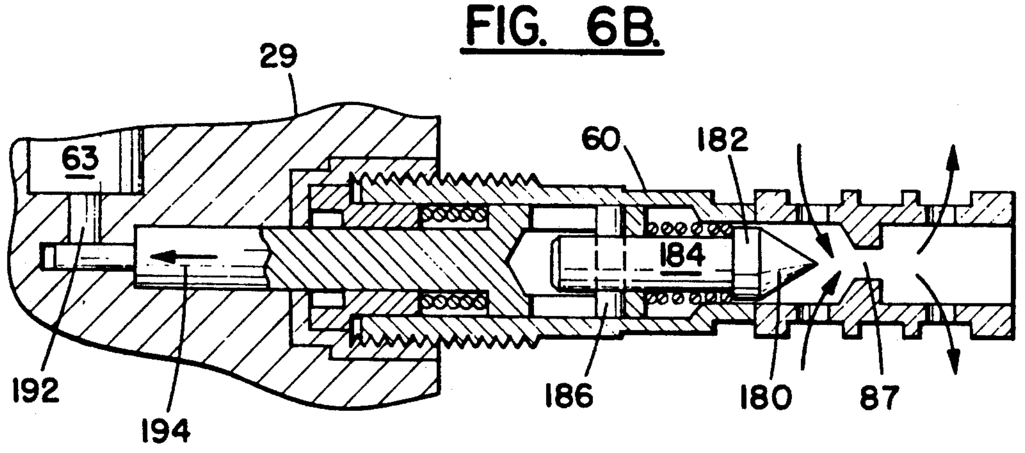
FIG. 6B is a cross-sectional view of the deactivation valve assembly in a third position.

Referring also to FIGS. 6, 6A and 6B, the deactivation valve assembly 27 will be further described. In the embodiment shown, the deactivation valve assembly 27 generally comprises a first directional flow check valve 68, a combined check valve and deactivation valve 60 and a solenoid limiter 62. The valve assembly 27 is located in receiving apertures 176 and 174 in the module block 29 and pump frame 28, respectively. The receiving aperture 174 in the pump frame 28 communicates with the three fluid conduits 54, 66 and 80 (see FIG. 5). The first check valve 68 generally comprises a frame member 73, a ball 76 and a spring 77. The valve 68 is suitably orientated and positioned to allow fluid to flow past the ball 76 from conduit 80 and reservoir 8 by suction from the pump 24, but prevents fluid from flowing in a reverse direction past the ball 76 and back into the reservoir 8. The frame member 73 has an inlet 72 at the conduit 80, a first inlet/outlet 74 that communicate with conduit 66, a reduced flow path aperture 87 that forms a seat for a plunger 78, and a second inlet/outlet 75 that communicates with conduit 54. The reduced flow path aperture 87 is generally located between the two inlet/outlets 74 and 75.

The combined check valve and deactivation valve 60, in the embodiment shown, generally comprises plunger 78, an extension 79, a plunger spring 81, an extension spring 83, a first frame member 70, a second frame member 71, end member 196, and a portion of the first check valve frame 73. As described above, the first check valve 68 is generally provided to allow fluid to be sucked from the fluid reservoir 8 through conduit 80 and past the ball 76, but substantially prevents the back flow of fluid from the valve 68 back into the fluid reservoir 8. Generally, the suction of fluid past the ball 76 in the first check valve 68 is accomplished by the vacuum or suction action created by both the inner piston 40 and outer sleeve 38 of the pump 24 as the second handle 6 is moved away from the first handle 4. In order to allow fluid that has been sucked into the central aperture 48 by the inner piston 40 not to flow back towards the conduit 66 when the inner piston 40 starts to push fluid out of the central aperture 48, the valve 60 can function as a directional flow check valve to allow fluid to be sucked into the central aperture 48 of the pump 24, but which can prevent flow in a reverse direction. However, it should be noted that, in the embodiment shown, the valve 60 is not merely a check valve. The valve 60 is a combined check valve and deactivation valve as further described below.

In the embodiment shown, the plunger 78 has a cone shaped tip 180, a ledge 182, a shaft 184 and a pin 186. The plunger spring 81 is generally located between the plunger ledge 182 and a leading portion 188 of the extension 79 to generally bias the tip 180 of the plunger 78 away from the extension 79 in a first forward direction. The pin 186 is fixedly connected to the shaft 184. A portion of the shaft 184 extends through an aperture in the leading portion 188 of the extension 79 and into a channel 190 of the extension 79. The pin 186 is located in a slot portion of the channel 190. The channel 190 and slot portion of the extension 79 cooperate with the shaft 184 and pin 186 of the plunger 78 to connect the plunger 78 to the extension 79, but nonetheless allow the plunger to be movably relative to the extension. Because the plunger 78 is biased in a first direction from the extension 79 by plunger spring 81, the plunger 78 must compress its spring 81 in order to move relative to the extension 79 as shown in FIG. 6A. Because the plunger 78 has a limited range of motion relative to the extension 79, generally defined by the movement of the plunger pin 186 in the extension slot, the plunger can be moved by movement of the extension 79 as will be described below. The tip 180 of the plunger 78 is generally intended to be seated in the aperture 87 and is displaceable from its seat by either the extension 79 or the force of fluid flowing from either inlet 72 or inlet/outlet 74. Thus, the plunger 78 and spring 81 can function as a check valve to allow fluid to pass through the valve 60 from the conduits 80 and 66 into the conduit 54, but can substantially prevent fluid from traveling in the reverse direction, except as noted below.

Generally, the extension spring 83 biases the extension 79 in a first forward position towards the aperture 87. In the embodiment shown, the extension 79 can be substantially prevented from moving or being moved by fluid pressure through the use of the solenoid limiter 62. Generally, the extension 79 has a shaft 194 that extends from inside the first frame member 70, through an aperture in the end member 196, through an aperture in the second frame member 71 and into the module block aperture or channel 176. The module block 29 also comprises a solenoid aperture 178 for at least partially housing the solenoid limiter 62. In the embodiment shown, the solenoid limiter 62 is generally provided to limit or prevent the movement of the extension 79 when desired. The limiter 62 generally comprises, in the embodiment shown, a solenoid 63, a movable pin 192, a spring 193 and an end plate 195 connected to the pin 192. The spring 193 and end plate 195 generally bias the pin 192 in a first relative retracted position as shown in FIG. 6. This first position is only obtained by the pin 192 when the solenoid 63 is not energized. When the solenoid 63 is energized, it causes the pin 192 to move from its first position to a second relatively extended position as shown in dotted lines in FIG. 6 compressing the spring 193. As shown in the figures, the module block aperture 176 communicates with the solenoid aperture 178. The limiter 62 is suitably mounted in the solenoid aperture 178 such that the pin 192 can be inserted into the module block aperture 176 when the solenoid 63 is activated or energized. When the solenoid pin 192 is moved into the module block aperture 176 it is located behind an end tip 198 of the extension shaft 194. In this location, the pin 192 prevents the extension 79 from moving backwards away from its forward biased position. A ledge 200 inside the first frame member 70 substantially limits movement of the extension 79 in a forward direction towards the aperture 87. The solenoid 63 is suitably connected to the power source 402 and controller 400 by wires 65 for energizing and deenergizing the solenoid 63 as desired. As described above, energizing and deenergizing the solenoid 63 moves the pin 192 into and out of the path of the end tip 198 of the extension 79. This controls the ability of the extension 79 to move. Thus, the controller 400 can control whether or not the extension 79 can move from its first forward biased position to a second rearward position. The control of the solenoid 63 and how this affects the operation of the valve 60 will be described in more detail below.

As its name implies, the combined check valve and deactivation valve 60 generally is capable of performing two functions; the function of a directional fluid flow check valve and the function of a valve that can deactivate at least a portion of the tool or hydraulic system. With the fluid supply conduit system described above, fluid from the fluid reservoir 8 can be sucked through conduit 80, valve assembly 27, and conduits 54 and 66 into the pump 24. The sucked fluid can be pushed out of the pump 24 through conduit 56 and check valve 58 into cylinder 18 for moving the ram 16. In the embodiment shown, even when the pin 192 is not blocking the path of the extension 79, the two springs 81 and 83 bias the plunger 78 and extension 79 in their home position as shown in FIG. 6. In this home position the plunger tip 180 is seated in aperture 87 and the leading portion 188 of the extension 79 is adjacent the first frame member ledge 200. When a vacuum is created by the inner piston's 40 movement, the vacuum draws fluid through the aperture 87 which causes the plunger 78 to move away from the aperture 87. Basically, the pressure difference caused by the vacuum causes the plunger to move relative to the extension 79 and compresses, at least partially, the plunger spring 81. Movement of plunger tip 180 out of the aperture 87 allows fluid to flow therethrough from inlet 72. Once the pump 24 reaches the top of its motion, pressure equalizes and the plunger spring 81 can once again seat the tip 180 in its seat effectively closing the aperture 87 from a reverse flow of fluid therethrough. The valve 60 can, thus, function as a directional flow check valve. The valve 60 can also function in this manner when the limiter pin 192 is located behind the extension tip 198 path. The description of the operation of the valve 60 as a deactivation valve will be described in detail further below.

Figure 7:
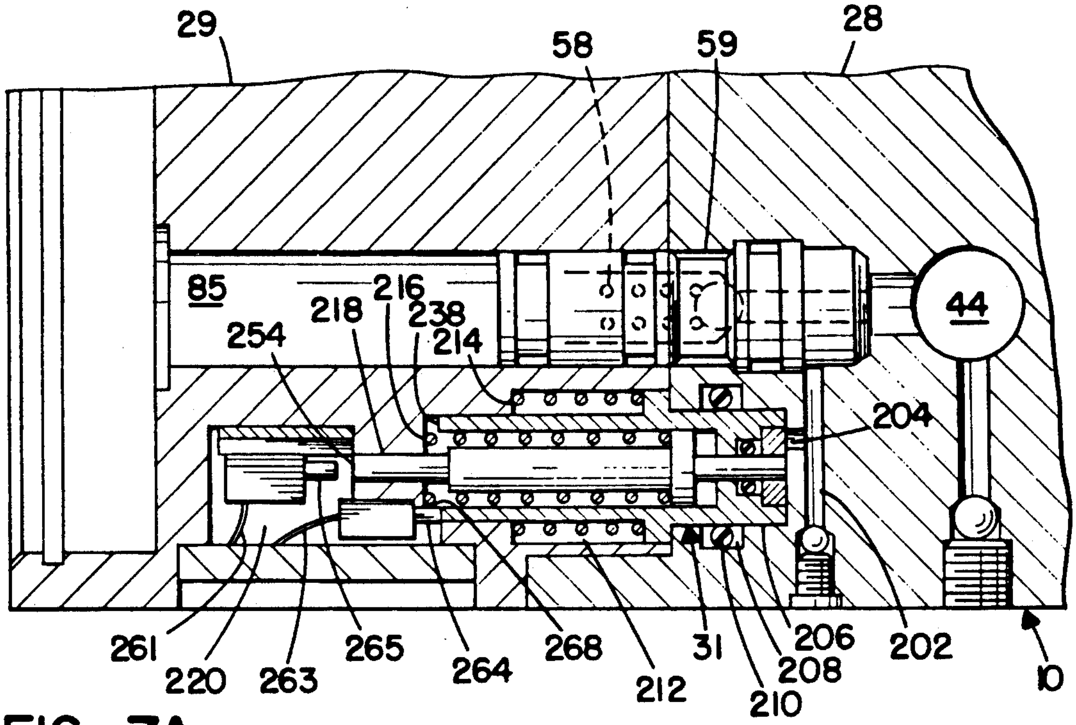
FIG. 7 is a cross-sectional view of the pressure sensor of the tool shown in FIG. 1 in a first position.
Figure 7A:
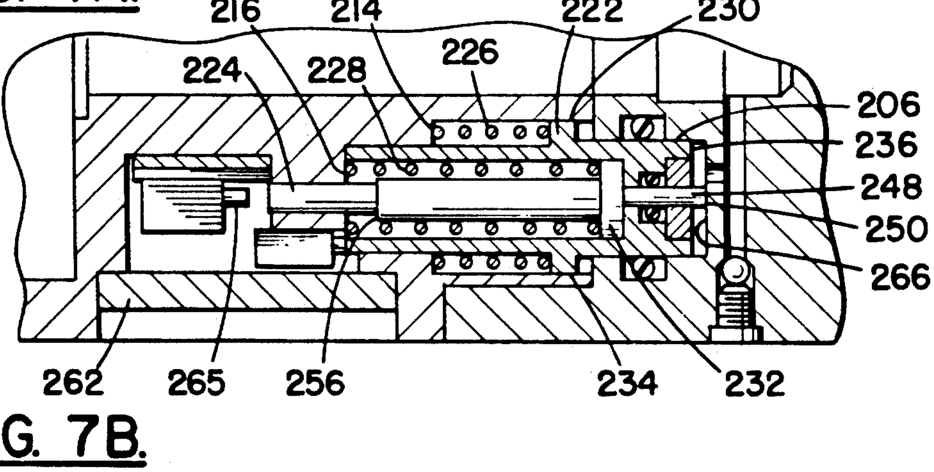
FIG. 7A is a cross-sectional view of the pressure sensor in a second position.
Figure 7B:
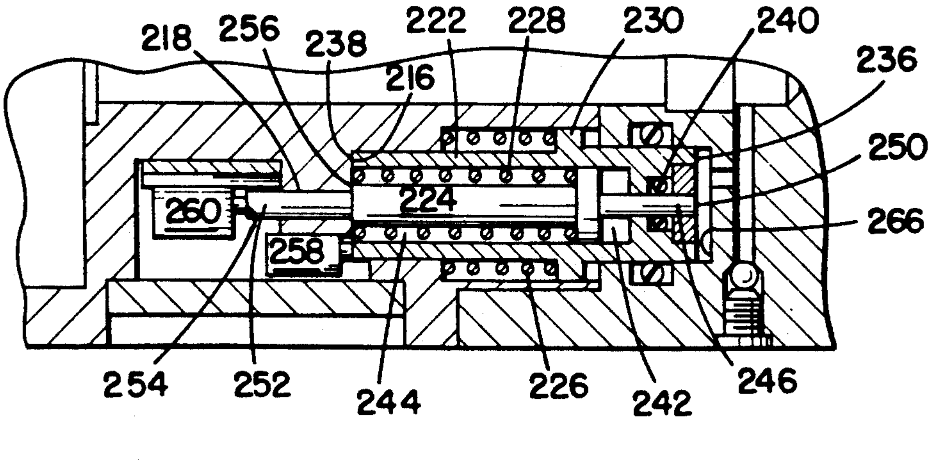
FIG. 7B is a cross-sectional view of the pressure sensor in a third position.

Referring now also to FIGS. 7, 7A and 7B, the pressure sensor 31, for the embodiment shown, will be described. Generally, the pump body or frame 28 has a first sensor conduit 202, a second sensor conduit 204 and a sensor aperture or channel 206 having a seal depression 208 for receiving a seal 210 and backup ring. The first conduit 202 generally extends from the check valve receiving aperture 59 to the second conduit 204 which extends into the sensor aperture 206. This pressure sensor conduit system thus provides a path for fluid to access the pressure sensor 31 having substantially the same pressure as the fluid in the pump 24 and, the cylinder 18 when the valve 58 is open. Aligned with the pump frame sensor aperture 206 is a module block sensor aperture 212. The module block sensor aperture 212 has a first ledge 214, a second ledge 216, and a hole 218 and an aperture 268 passing into a switch area 220.

Located within the pump body sensor aperture 206 and module block sensor aperture 212 is the pressure sensor 31. In the embodiment shown, the pressure sensor 31 generally comprises a first low pressure plunger 222, a second high pressure plunger 224, a low pressure spring 226 and a high pressure spring 228. The low pressure spring 226 is generally, at least slightly, compressed between a ledge 230 of the first plunger 222 and the first module block ledge 214 to bias the low pressure plunger 222 towards the pump body 28 and the second sensor conduit 204. The high pressure spring 228 is generally, at least slightly, compressed between a ledge 232 of the second plunger 224 and the second module block ledge 216 to also bias the high pressure plunger in the same direction as the low pressure plunger 222. The low pressure plunger 222 is movable in a plunger cavity or receptacle 234 formed by the two aligned apertures 206 and 212. Generally, the low pressure plunger 222 has a front face 236, a rear face 238, a seal and retainer receptacle 240 located at the front face 236, the ledge 230, and a center channel 242 having an enlarged area 244 and a relatively small area 246. The high pressure plunger 224 generally comprises a front section 248 having a front face 250, a rear section 252 having a rear face 254, the ledge 232, and a second ledge 256. The high pressure plunger 224 is coaxially located, at least partially, inside the center channel 242 of the low pressure plunger 222. The front section 248 of the high pressure plunger 224 generally extends through the small area 246 of the low pressure plunger center channel 242 and is movable therein. When the high pressure plunger 224 is biased in a home position, i.e.: when fluid pressure is not sufficiently high to compress the high pressure spring 228, its front face 250 is biased into contact with the pump body 28. When the low pressure plunger 222 is biased by its low pressure spring 226 in a home position, i.e.: when fluid pressure is not sufficiently high to compress the low pressure spring 226, it also has its a front face 236 biased into contact with the pump body 28.

Located in the switch area 220, in the embodiment shown, are two micro switches; a low pressure switch 258 and a high pressure switch 260. The switches 258 and 260 are fixedly mounted to the module block 29 with a removable cover 262 covering the switches 258 and 260 and switch area 220. The switches 258 and 260 are connected to the controller 400 (see FIG. 9) by wires 259 and 261 that can pass through a hole 263 (see FIG. 1) in the cover 262. Each micro switch 258 and 260 has a depressible button or lever 264 and 265 aligned for engagement and movement by the rear faces 238 and 254 of the low and high plungers 222 and 224, respectively.

The pressure sensor 31, in the embodiment shown, is generally intended to have at least three positions and to signal the controller 400 of a change in pressure. The three positions include a home position as shown in FIG. 7, a low pressure position as shown in FIG. 7A, and a high pressure position as shown in FIG. 7B. Generally, the home position, as described above, comprises both plungers 222 and 224 being biased against the pump body 28 due to insufficient hydraulic pressure to move either plunger 222 or 224 or compress either spring 226 or 228. In this home position, both the low pressure plunger rear face 238 and the high pressure plunger rear face 254 are suitably spaced from the switches 258 and 260 such that no contact is made with the buttons 264 and 265 of the switches 258 and 260, respectively. In the embodiment shown, the switches 258 and 260 can generally signal the controller 400 if they are either in an "ON" state or an "OFF" state. The ON state for each switch being when the plungers 222 and 224 depress the switch buttons 264 and 265. The OFF state for each switch being when their buttons are not depressed. Thus, in the home position shown, the pressure sensor 31 can signal the controller, by both switches 258 and 260 being off, that pressure at the cylinder 18 is not sufficiently high to move either plunger to trigger an ON state for either switch.

In the low pressure position, as shown in FIG. 7A, a suitable amount of hydraulic fluid pressure exists at the cylinder 18 to move the low pressure plunger 222. As is known in the art, hydraulic pressure will increase as a ram contacts a connector or article to be crimped and meets resistance to its advancement. In the embodiment shown, increased hydraulic pressure from contact of the ram 16 with an article is translated, via the center conduit 85 in the module block, through check valve aperture 59 and the two conduits 202 and 204 in the pump body, to the plunger cavity 234 and against the first faces 236 and 250 of the plungers 222 and 224, respectively. In a preferred embodiment of the present invention, the low pressure spring 226 and area on the front face 236 of the low pressure plunger 222 is suitably provided to compress and allow the low pressure plunger 222 to move from its home position to a switch triggering position when hydraulic pressure reaches a predetermined pressure, such as about 95 psi. However, any suitable strength low pressure spring 226 may be provided as well as any suitable area of the low pressure plunger front face 236 for selection of any suitable predetermined hydraulic pressure. The low pressure plunger switch triggering position generally comprises the low pressure plunger 222 having been moved away from the pump body interior aperture face 266 by hydraulic fluid. The pressure of the hydraulic fluid causes the low pressure spring 226 to be, at least partially, compressed and the rear face 238 of the low pressure plunger abuts against the module block ledge 216 and also has a portion of the rear face 238 that projects through aperture 268 to depress or trigger the button 264 of the low pressure switch 258. Thus, the switch 258 can signal the controller 400 of the occurrence of the predetermined pressure that caused movement of the low pressure plunger 222 from its home position to its switch triggering position. In the embodiment shown, the two plungers 222 and 224 are separably movable relative to each other. Thus, movement of the low pressure plunger 222 is not dependent upon movement of the high pressure plunger 224; nor vice versa. Rather, the movement of the high pressure plunger 224 from its home position, similar to the movement of the low pressure plunger 222, is dependent upon the level of hydraulic pressure being sufficiently high to force the high pressure plunger 224 to compress the high pressure spring 228. In a preferred embodiment, the high pressure spring 228 and the area of the front face of the high pressure plunger 224 are suitably selected to compress and allow the high pressure plunger 224 to move from its home position to a switch triggering position when hydraulic pressure reaches a predetermined pressure, such as at about 10,500 psi. However, any suitable strength spring and area for the high pressure plunger front face may be provided for any suitable predetermined pressure to move the high pressure plunger 224 to its switch triggering position.

The high pressure position for the sensor 31 is shown in FIG. 7B. In the embodiment shown, hydraulic fluid pressure is sufficiently high to compress both the low and high pressure springs 226 and 228. The high pressure plunger 224 has been moved, by the force of hydraulic fluid acting against its front face 250, to its switch triggering position wherein the front face 250 is spaced from the pump body interior aperture face 266. The high pressure plunger second ledge 256 is in contact with the module block ledge 216. A portion of the high pressure plunger 224 has moved through the hole 218 to contact and depress or trigger the button 265 on the high pressure sensor 260 and thereby signal the controller 400 of the occurrence of the predetermined pressure in the hydraulic system. When the hydraulic pressure is released via the relief/release valve 26, the springs 226 and 228 can return the plungers 222 and 224 back to their home positions for the start of another crimp cycle. It should be understood that although the pressure sensor of the embodiment shown has been described in detail, any suitable type or number of pressure sensors can be provided.

Referring particularly to FIGS. 2, 8, 8A and 8B, the head section 12 for the tool 2 shown in FIG. 1 will be further described. The cylinder body 14 generally has a first end 270 mountable in a seat 272 in the module block 29 and has a conduit 274 for conduiting fluid from the module block central conduit 85 to the cylinder 18. The cylinder body 14 also has a second end 276 with a substantially open top into the cylinder 18 and having a first end 278 of an anvil support frame 280 connected thereto. The anvil support frame 280 also has a center section 282 having an aperture 284 aligned with the cylinder 18 for passage of the ram 16 therethrough. A second end 286 of the anvil support frame 280, in the embodiment shown, forks into two side members 288 and 290 having holes 292 and 294 for receiving pins 296 and 298. The anvil 15 is wedge shaped with a center section 300 and two end sections 302 and 304 having slots 306 and 308 for receiving portions of the anvil support frame side members 288 and 290. Holes 310 are also provided in the end sections 302 and 304 for alignment with the holes 292 and 294 for receiving the pins 296 and 298 and thereby fixedly, but removably connecting the anvil 15 to the anvil support frame 280. In a preferred embodiment, the pins 286 and 298 can be moved for removing or pivoting open the anvil 15.

The indentor or ram 16 is movably mounted in the cylinder 18 and passes through the anvil support frame aperture 284 with a leading or forward tip 312 intended for contacting an article to be compressed. The ram 16 is generally column shaped with a rear extending ring section 314 for housing a seal 316 that can also act as a stop or limiter to the forward and reward movement of the ram 16 upon contact with the anvil support frame center section 282 or body first end 270. The ram 16 has a center aperture 318 for at least partially housing a return spring 320. The head section 12 also has two spring mounts 322 and 324 for fixedly connecting the two ends of the spring 320 thereto. One spring mount 322 is connected to the ram 16 and the other spring mount 324 is connected to the cylinder body first end 270. Generally the ram 16 has a home position wherein the ram 16 is substantially fully retracted into the cylinder 18. Forward movement of the ram 16 from its home position, when advanced by hydraulic fluid in the cylinder, puts the spring 320 in tension. Upon release of hydraulic pressure and fluid from the cylinder 18, the spring 320 can retract the ram 16 back to its home position.

Figure 8:
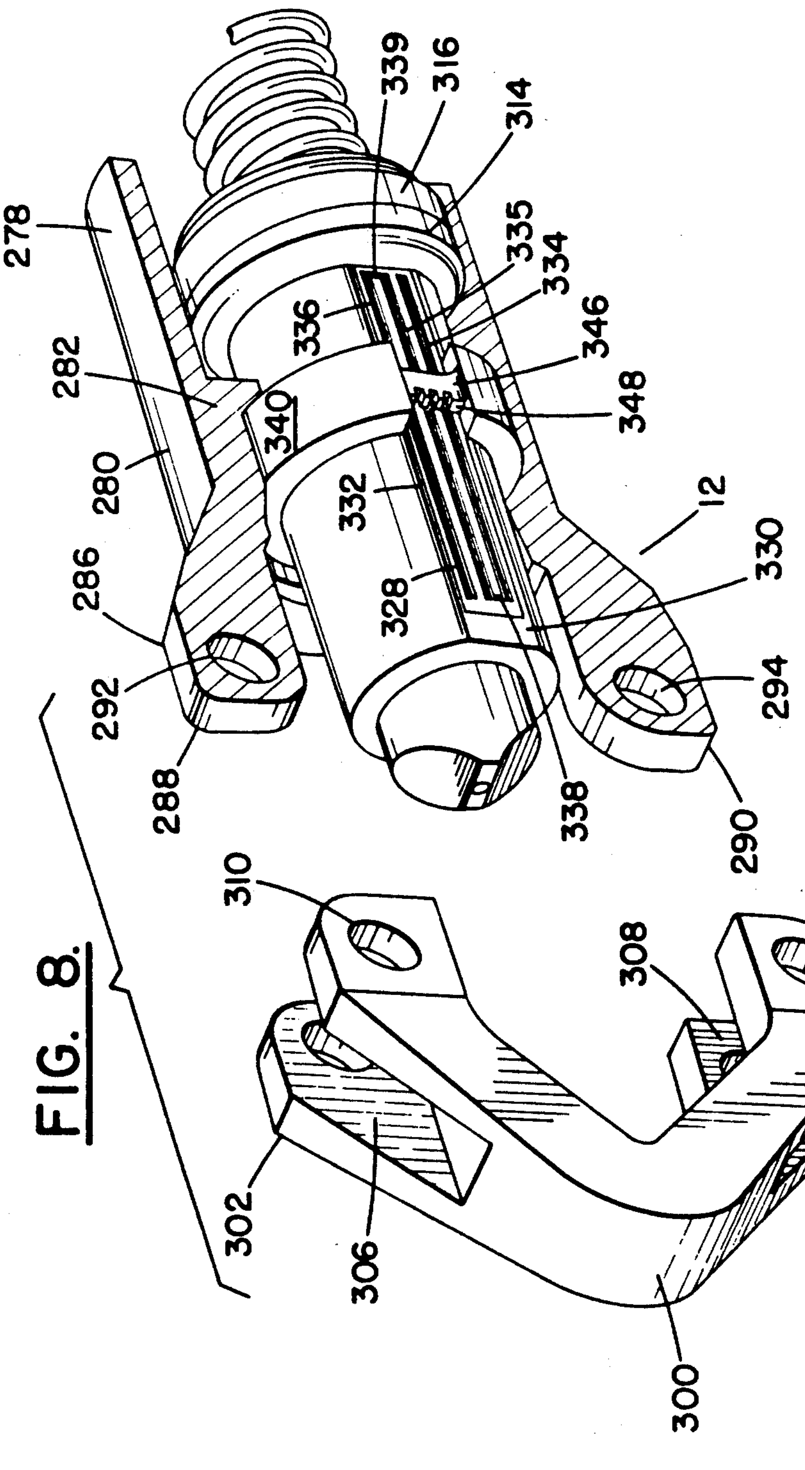
FIG. 8 is a partially exploded partial cross-sectional view of a portion of the head section of the tool shown in FIG. 1.
Figure 8A:
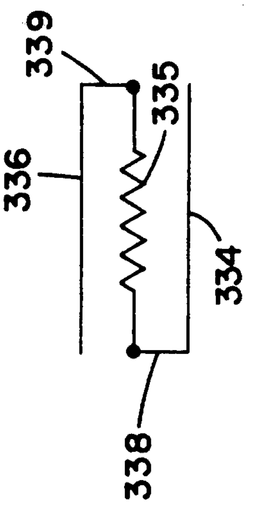
FIG. 8A is a schematic electrical diagram of the open electrical circuit formed by the resist strip on the ram of the tool shown in FIG. 1.
Figure 8B:
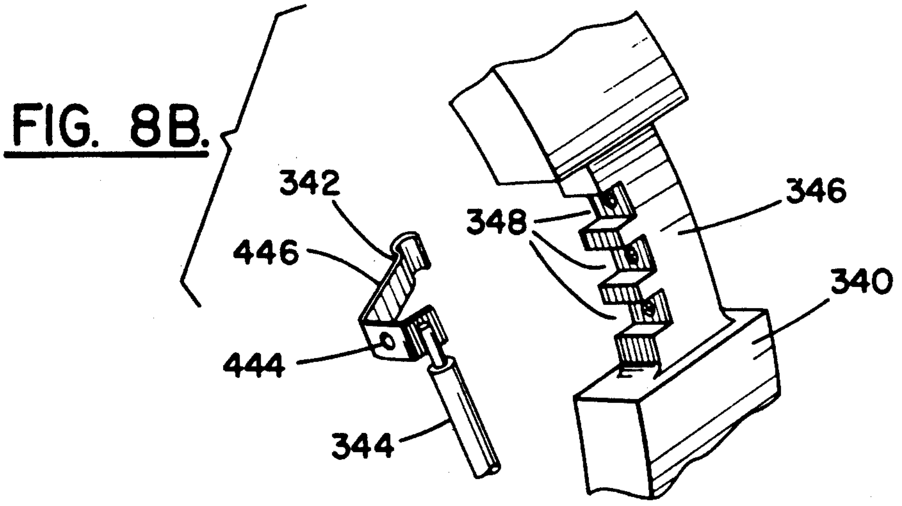
FIG. 8B is an enlarged partial exploded view of a pick-up and bar of the position sensor.

In the embodiment shown, the head section 12 has an electronic ram position sensor 326 generally comprising a resist strip 328 along a section of a length of the ram 16 and three electrical pick-ups or contacts 342 one of which is shown in FIG. 8B. In the embodiment shown, the position sensor 326 is generally provided for signaling the controller 400 of the position or location of the ram 16 relative to a reference location, such as its home position or a connector contact position. As shown best in FIG. 8, one side of the ram 16, in the embodiment shown, has a relatively flat section 330 with a sheet 332 of non-conductive material therealong and three spaced strips 334, 335 and 336 of conductive material. The sheet 332 can be comprised of any suitable material, such as a polyimide material, and can have any suitable thickness, such as about 0.015 inch. The sheet 332 generally electrically insulates the strips 334–336 from the ram 16 which is usually metallic. In the embodiment shown, first and third strips 334 and 336 are comprised of a highly conductive material, such as silver. The second strip 335 is generally comprised of a conductive material having a predetermined electrical resistance. The resist strip 328 also has two bridges 338 and 339 located at opposite ends of the second center strip 335 that electrically connect the center strip 335 to the first strip 334 and the second strip 336, respectively. Thus, the resist strip 328 forms an open electrical circuit schematically shown in FIG. 8A. Located and fixedly mounted between the ram 16 and the anvil support frame 280 at the center section 282 is a bearing ring 340 that also, at least partially, supports the three electrical pick-ups 342. The bearing ring 340 is made of a suitable material, such as a polyimide material, and impregnated with a lubricant to allow movement of the ram 16 therein relatively freely. The bearing ring 340 also acts as a wiper for cleaning the ram 16 when retracted. The ring 340 has a bar section 346 slightly spaced from the ram 16 having three slots 348, one for each of the pick-ups 342. All of the pick-ups, in the embodiment shown, are substantially the same, but located on the bar 346 at different locations. The pick-ups are each separately connected to the bearing ring 340 at the bar 356 by screws (not shown). Because the bearing ring 340 is comprised of an electrically insulative material, such as a polyimide material, and because the pick-ups 342 are spaced from each other on the bar 346, the pick-ups are electrically isolated from each other on the bar 346. Of course, any suitable means could be provided to stationarily connect the pick-ups in the head section 12. Suitable means are also provided for fixedly connecting three individual wires 344 to each of the individual pick-ups 342, such as by soldering. The other ends of the wires 344 are connected to the controller 400 and the wires 344 are able to pass through the anvil support frame 280 at apertures 440–442 (see FIG. 1). As shown, each of the pick-ups have a first section 444 that is connected to the bar 346 and, at least partially, located in a slot 348. The pick-ups 342 also have a second section 446 that extends from the first section 444 in a cantilever fashion. The second sections 446 are spring loaded between the bar 356 and the ram 16 and act as spring contacts with the strips 334–336 of the resist strip 328. Each of the pick-ups 342 is suitably located on the bar 346 to make an individual electrical contact with one of the strips 334–336. Thus, the resist strip 328 is used to complete an open circuit formed by the controller 400 and the position sensor wires 344 and pick-ups 342.

Generally, the resist strip 328 and pick-ups 342 form the position sensor for signaling the location of the ram 16 including when the ram 16 contacts a connector and thereafter. In an alternate embodiment, the position sensor can signal the ram location only at predetermined select times or occurrences. In the embodiment shown, a first pick-up 342 can receive electricity from the controller 400 and is capable of transmitting the electricity to the first resistive strip 334. The electricity, in turn, can travel along the first strip 334, through the bridge 338, and along the second strip 335 where the electricity is picked up by a second pick-up 342 and sent back to the controller 400. The third strip 336 and a third pick-up 342, in the embodiment shown, are generally provided as a ground to measure the ratio of voltages. Thus, measurement is invarient to bulk changes in resistance. Because the ram 16 is movable, the length that the electricity must travel along the first strip 334 and the length that the electricity must travel along the second strip 335 change as the ram 16 moves. The change in length that the electricity must travel along the resistive material of the second strip 335 changes the amount of electrical resistance between the first and second pick-ups; dependent upon the location of the ram 16 relative the pick-ups. The controller 400 can generally supply the first pick-up 342 with a constant voltage of electricity. This electricity is passed from the first pick-up 342 into the first strip 334 where it travels through the bridge 338 into the second strip 335. The second pick-up can return the electricity to the controller 400. Because the length of the second strip 335 between the bridge 338 and the second pick-up 343 varies, the electrical resistance between the first and second pick-ups varies. Thus, the position sensor functions in the same manner as a variable resistor; variable by movement of the ram 16. The controller 400, can measure the voltage that is received at the second pick-up and compare this sensed voltage to a memory of potential voltages and ram positions to determine the location of the ram 16. Alternatively, any suitable means for determining ram position from sensed voltage or voltage difference can be used including a mathematical equation or equations. In addition, any suitable means can be used for determining ram position other than electronically or electrically. In the embodiment shown, the ram 16 is suitably mounted in the head section 12 such that the ram will not rotate and thereby cause the misalignment of the pick-ups 342 and strips 334–336 In an alternate embodiment, the ram 16 and frame 13 may be suitable keyed or otherwise provided with means for preventing rotation of the ram 16. Alternatively, the position sensor 236 may be provided with suitable contacts between the ram 16 and frame 13 such that rotation of the ram 16 is not of concern.

Referring particularly to FIGS. 1 and 3, the controller 400, power source 402, and second handle 6 will be further described. The second handle 6 generally comprises a pump handle interface member 350, a controller housing 352 having a control and signal console 353, a battery tube 354 and an end cap 356. The interface member 350 is pivotally connected to pivot arm 30 and the pump 24 for movement of the pump 24 when the second handle 6 is moved relative to the first handle 4. In the embodiment shown, an electrical connector 358 is provided for connecting wires from the solenoid 63, pressure sensor switches 258 and 260, and position sensor pick-ups 342 to the controller 400 and power source 402. The connector 358 can also be used as an input/output terminal for connecting the tool 2 to an external device or apparatus as will be described below. In the embodiment shown, the controller housing 352 is fixedly, but rotationally held, at least partially, within the interface member 350 and has a center chamber 360 and conduit 362 such that wires from the connector 358 can pass through the conduit 362 and be connected to the controller 400 located in the chamber 360 and the power source 402 which is located in the battery tube 354. The rotational feature is generally provided for positioning a release button over the relief/release valve for manual release of fluid. The console 353, in the embodiment shown, is a cover plate that covers the chamber 360 and has three signal lights 364, 365, 366 which are connected to the controller 400 and an "ON/OFF" switch or button 368 connected between the power source 402 and the controller 400. In the embodiment shown, the first signal light 364 is provided for signaling that the power source is weak and needs to be replaced or recharged. The second light 365 is provided for signaling the occurrence of a bad crimp or permanent disablement of the tool. The third light 366 is provided for signaling that the tool is operational after depressing the ON/OFF switch 368. The battery tube 354 is connected to the controller housing 352 with a contact connector 370 therebetween. In a preferred embodiment, the power source comprises four dry cell batteries. In an alternate embodiment, any suitable type of power supply may be provided, such as a rechargeable battery. The controller 400 is suitably mounted to the controller housing 352 in chamber 360. Suitable means may be provided to insulate the controller 400 from both physical shock, such as if the tool is dropped, and electrical overload, such as if the tool inadvertently has a high electric charge passed therethrough from an electric cable being crimped. In addition, preferably the tool 2 has an outer skin or cover of dielectric material for protecting an operator from electric shock and for at least partially covering wires between the controller 400 and the deactivation valve assembly 27, pressure sensor 31 and position sensor 326.

Figure 9:
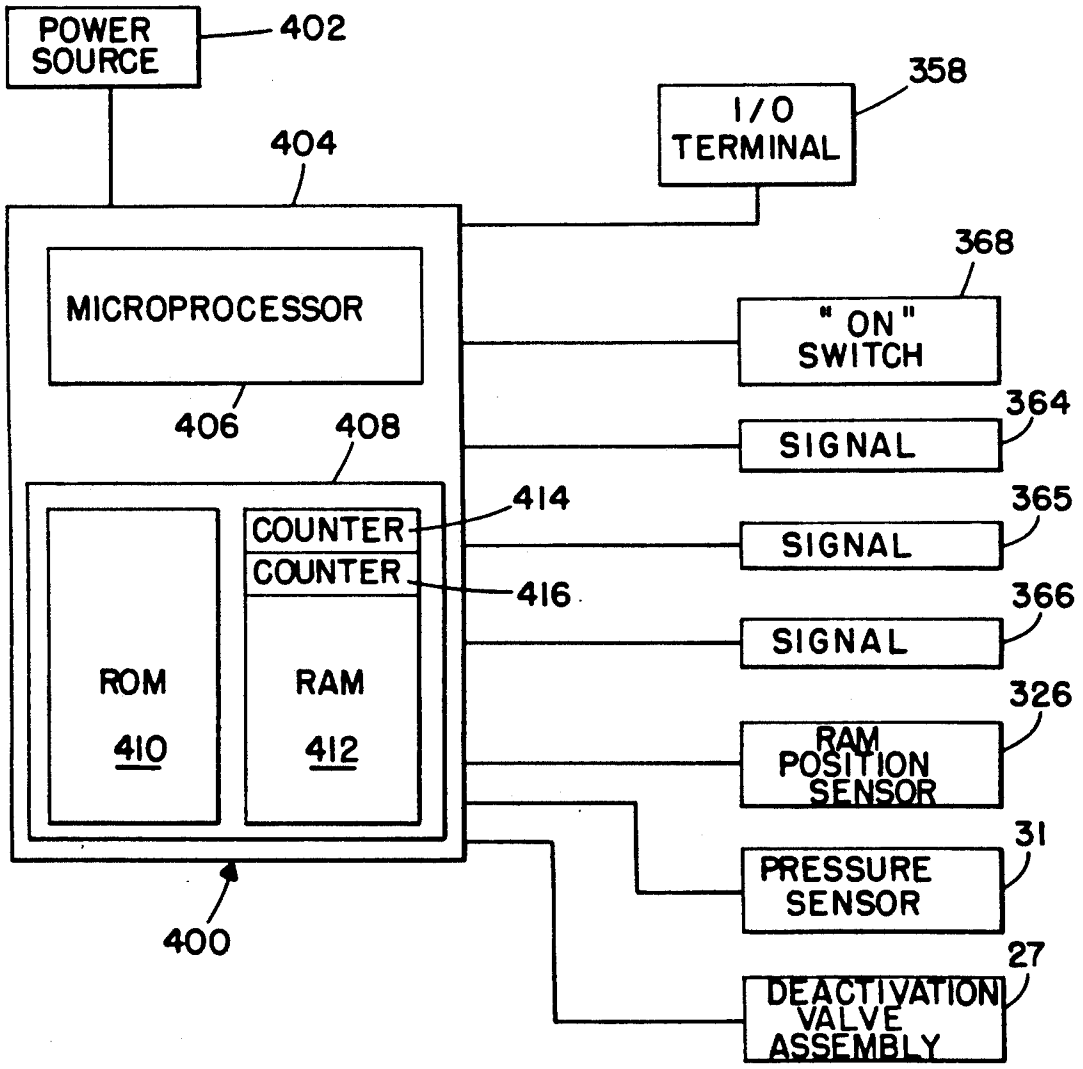
FIG. 9 is a schematic block diagram of the system used in the tool shown in FIG. 1.

Referring also to FIG. 9, the controller 400 and some of its functions will be further described. In the embodiment shown, the controller 400 is generally comprised of a computer 404, preferably comprising a microprocessor 406 and a memory 408. The memory 408 may be either internal or external to the microprocessor 406 and preferably comprises a Read Only Memory (ROM) 410 and a Random Access Memory (RAM) 412. The ROM 410 generally comprises instructions and constants for the operation of the microprocessor 406 and may be comprised of a Programmable Read Only Memory (PROM) or an Electrically Erasable Programmable Read Only Memory (EEPROM) that can be programmed either at the factory and/or in the field by the user. The RAM 412 generally constitutes a working memory having read and/or write capabilities for storing predetermined crimping information and providing stored crimping information to the microprocessor 406 and/or the input/output terminal 358. The predetermined crimping information may comprise suitable information such as signals from the ram position sensor 326, the pressure sensor 31, information calculated or determined by the microprocessor 406, or any other suitable information. In the embodiment shown, the computer can generally control the supply of electricity to the signals 364–366, the ram position sensor 326, the pressure sensor 31, and the deactivation valve assembly 27. In the embodiment shown, the computer 404 can receive signals from the sensors 31 and 326 and process these signals in accordance with stored instructions in the ROM 410 and stored system or crimp characteristics in the memory to energize or deenergize the solenoid 63 in the deactivation valve assembly 27. Alternatively, the computer 404 could control additional features of the tool 2. The controller 400 need not be provided as a microprocessor and memory. Any suitable means for storing predetermined system or crimp characteristics and means for comparing sensed system characteristics and stored system characteristics may be provided including a suitable system of registers and counters. In an alternate embodiment, the controller 400 may only be provided for recording and/or signaling system or crimp characteristics or occurrences and not for controlling operation of the tool.

When the tool 2 is not in use or in an "OFF" state, no power is supplied to the solenoid 63 in the deactivation valve assembly 27. Therefore, in its deenergized state, the pin 192 of the limiter 62 is displaced from the path of the end 198 of the extension 79 in the aperture 176 by spring 193 biasing the end plate 195 connected to the pin 192. Only upon energizing the solenoid 62 is the spring 193 compressed and the pin 192 moved into the aperture 176 to stationarily hold the extension 79. In the OFF state, although an operator may move the handles 4 and 6 and thereby use the pump 24 to start to move the ram 16, the amount of hydraulic pressure generated in the tool 2 is limited by the amount of pressure necessary to compress the extension spring 83 and move the extension 79, and to open the check valve 168 to the reservoir. In a preferred embodiment, the amount of pressure necessary to compress the extension spring 83 is about 95 psi but may also be significantly less. Also in a preferred embodiment, the amount of pressure necessary to compress the check valve spring 172 to the reservoir is about 95 to about 100 psi. Thus, in its OFF state, the tool 2 can only operate in a high volume pressure mode and cannot obtain a hydraulic pressure higher than the amount of pressure necessary to compress the extension spring 83 and check valve spring 172 because, as will be described below, movement of the extension 79 by hydraulic pressure can cause the unseating of the cone shaped tip 180 of the plunger 78 from its seat in aperture 87 in the third frame member 73. The unseating of the plunger 78 causes the pressure generated in the pump central aperture 48 to be the same as pressure in the pump body conduit 66 which communicates with the check or relief valve 168. The relief valve 168 is set to open at a relatively low pressure, such as about 100 psi. Therefore, hydraulic pressure generated by the pump 24, both by the inner piston 40 and outer sleeve 38, cannot deliver sufficient pressure at the cylinder 18 for suitable crimping of articles. This substantially prevents use of the tool 2 until an operator activates the ON/OFF button 368 and is described in more detail below FIG. 6 shows the valve 60 in a closed position. This is the closed position for both the "OFF" state, and the "ON" state of the tool 2 at low pressure pumping. FIG. 6 also shows the valve 60 in a closed position in the ON state of the tool at high pressure pumping wherein the dashed lines show the location of the limiter pin 192 blocking movement of the extension 79

The operation of the deactivation valve assembly 27 will now be described for the situation wherein the tool is in an "ON" state; i.e.: an operator has depressed the ON/OFF button 368 and the controller 400 allows power to be supplied from the power source 402. In the ON state, the check valve and deactivation valve 60 generally can have an open position based upon three potential tool conditions, dependent upon the presence or absence of the solenoid pin 192 in the aperture 176 and the amount of hydraulic pressure. FIG. 6 shows the first open position of the valve 60 wherein the solenoid pin 192 does not prevent the extension 79 from moving. However, the position shown in FIGS. 6A is when the pump 24 is pumping in its high volume low pressure mode with suction generated in the pump center aperture 48 (see FIG. 4) by upward movement of the inner piston 40 draws fluid from channel 80, through check valve 68, through the valve 60 and into the pump center aperture as shown by arrows B. The suction caused by the inner piston 40 can cause the valve plunger 78 to be unseated from aperture 87 as shown. The valve plunger 78 can be reseated by its spring 81 when the inner piston 40 becomes stationary. Upon downward stroke of the pump 24, the valve 60 once again can assume its first open position because hydraulic pressure from the pump body conduit 66, generated by the pump outer sleeve 38, can push the plunger 78 back to allow fluid to flow from inlet/outlet 74, as shown by arrows C, through the aperture 87 and out inlet/outlet 75, as shown by arrows B. Upon the pump 24 not being operated, the valve 60 returns to its closed position as shown in FIG. 6. Thus, with the pin 192 not extended into the block conduit 176, the valve 60 can function substantially the same as a ball and spring check valve. However, the valve 60 also can function to deactivate the pump 24 above a predetermined pressure upon the controller 400 de-energizing the solenoid 62 at a predetermined condition, such as movement of the ram 16 to a predetermined location or the occurrence of a predetermined pressure in the hydraulic system. Because the valve 60, in the embodiment shown, performs both functions of a check valve and deactivation valve for the pump 24, the extension 79 is provided as a movable member that can also move the plunger 78, but which can either remain stationary and/or be held stationary at predetermined conditions. Generally, the first open position of the valve comprises the extension spring 83 holding the extension stationary while the plunger 78 is moved as it functions as a check valve at a high volume low pressure operation of the pump 24. FIG. 6 also shows the second open position of the valve 60, but at the low volume high pressure operation of the pump 24 with the solenoid pin 192 located in the channel 176 (dashed lines) holding the extension stationary. In this second open position, the valve 60 is still functioning as a check valve, but at the low volume high pressure operation of the pump as mentioned above. FIG. 6B shows the third open position of the valve 60 wherein the valve is open and functioning as a deactivator valve. As shown, the solenoid pin 192 is not blocking the rearward path of the extension such that the extension 79 is capable of moving by compressing its spring 83. The reason the valve 60 is open is because pressure, generated by the inner piston 40 of the pump 24, acts against the extension 79 at a sufficiently high level of pressure to force the extension 79 to move backwards compressing its spring 83. The extension 79, being connected to the plunger 78 and having a greater area than the plunger 78 pulls the plunger 78 off its seat as the extension moves. Thus, when the solenoid pin 192 does not block the movement of the extension 79, hydraulic pressure, such as about 95 psi, acting against the extension 79 can force the extension to move rearward and compress its spring 83. This movement of the extension 79 rearward can cause the plunger 78 also to be moved with the extension 79 because of the contact of the plunger pin 186 with the leading portion 188 of the extension 79 as shown in FIG. 6B. This position of the assembly 27 and valve 60, even though the tool 2 is in an "ON" state, effectively prevents the pump 24 from delivering additional hydraulic fluid to the cylinder 18. This is done by opening a path from the low volume high pressure portion of the pump 24 (inner piston 40 area) to the check valve 168 when pump action is occurring at the pump 24. Thus, so long as the hydraulic pressure at the cylinder 18 is higher than the amount of force necessary to compress the extension spring 83 and check valve spring 172, the ram 16 is prevented from being further advance by the pump 24. This effectively disables the further crimping ability of the tool, at least temporarily. In the embodiment shown, the hydraulic pressure at the cylinder 18 is not changed by the deenergization of the solenoid 63 by the controller 400. However, in an alternate embodiment of the invention, a second deactivation valve may be provided in the fluid return conduit system to replace or supplement the use of the relief/release valve 26. Alternatively, any suitable electrically controlled valve may be used in a fluid return conduit system with the valve 60 could be replaced with a ball and spring check valve. In addition, although the valve 60 and its operation and functions have been described in detail above, it should be understood that any suitable electrically or electronically controlled valve may be used. In addition, a mere computer controller deactivation valve may be provided, not a combined check valve and deactivation valve.

Figure 10:
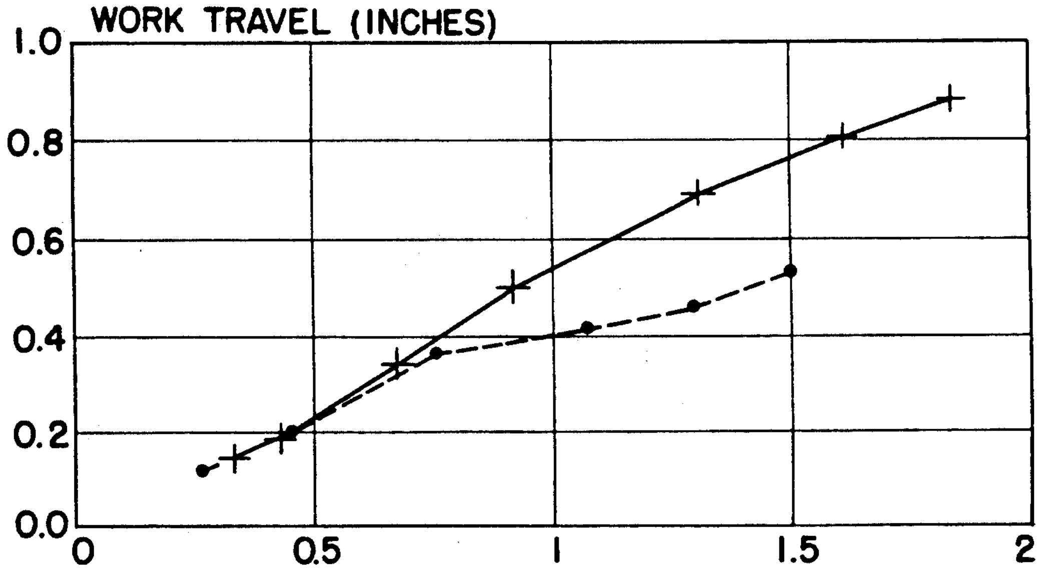
FIG. 10 is a graph of data that can be stored in the memory of the system shown in FIG. 9. p

Referring also to FIG. 10 there is shown a graph of the type of information that the memory 408 might contain or its mathematical equivalence. It should be emphasized, however, that the computer 404 may be provided with any suitable type of instructions or constants. In addition, any suitable means can be used or provided to change instructions and constants for different applications if so desired including replaceable memory chips. FIG. 10 shows a graph made from experimental data obtained with a geometric configuration of a ram and anvil similar to the tool 2. The graph shows desired ram or indentor travel versus the size of connectors measured by their outer diameter (O.D.) for Copper and Aluminum electrical connectors that results in a desired good crimp. A good crimp is the compression of a connector about an article being crimped to produce predetermined characteristics such as the prevention of the article being removed from the connector even under a predetermined tensile force which can obviosly vary with the size and type of connector. Conversely, a bad crimp is a crimp that does not have the predetermined characteristics. Basically, apart from defective materials, there are three ways a bad crimp can generally occur. First, if the connector was not compressed sufficiently onto an article, the connection would lack sufficient characteristics to be considered a good crimp. Second, if the connector was over compressed onto an article, both the connector and article might be damaged thereby also lacking sufficient characteristics to be considered a good crimp. Third, if a foreign object, such as a rock or other hard article, inadvertently became lodged between the connector, article, anvil, or ram, the crimp would also lack sufficient characteristics to be considered a good crimp.

Figure 11A:
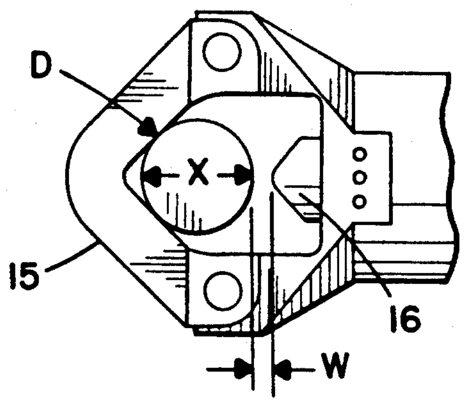
FIG. 11A is a schematic view of a head section and first connector having a relatively large size with a ram at a home position.
Figure 11B:
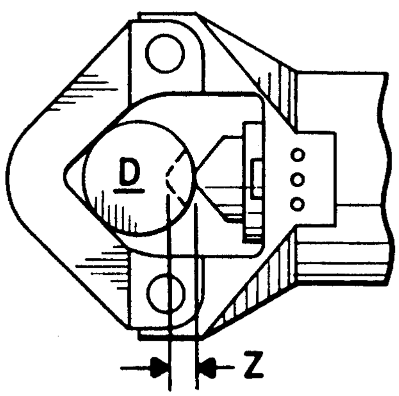
FIG. 11B is a view as in FIG. 11A with the ram at a connector contact position.
Figure 11C:
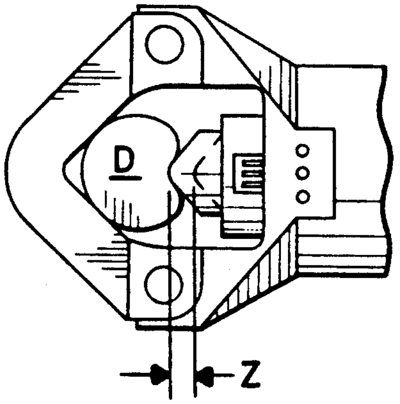
FIG. 11C is a view as in FIG. 11A with the ram at the end of its work travel.

Ram travel or indentor travel generally comprises free travel and work travel. Free travel is the movement of the ram 16 from its home position, as shown in FIG. 11A, to a connector contact position, as shown in FIG. 11B. The connector contact position, in the embodiment shown, occurs when the ram 16 meets a predetermined resistance to its advancement, because of the location of the connector D between the ram 16 and the anvil 15. In a preferred embodiment of the present invention the connector contact position occurs at about 95 psi. Work travel is the further advancement of the ram 16 from the end of the free travel movement, at the connector contact position, compressing or crimping the connector D between the ram 16 and anvil 15, as shown in FIG. 11C. Ram travel or indentor travel is the sum of the free travel length and the work travel length. Thus, the graph of FIG. 10 shows an optimum or desired length of indentor travel relative to the size of connectors based upon experimental data. In the embodiment shown, the tool 2 cannot distinguish between copper and aluminum connectors. However, as shown in FIG. 10, desired indentor travel for the same size connectors made of different materials is not identical. However, the potential differences in the quality of crimps corresponding to locations actually on the two lines of the graph are relatively small when compared to the quality of crimps corresponding to locations between the two lines of the graph. Therefore, the computer 404 can be programmed to recognize that any crimp made by the tool 2 that corresponds to a condition located on or between the two lines of the graph can be considered a good crimp. Any crimp made that does not correspond to a position located on or between the two lines can be considered a bad crimp. The ROM 410 of the computer 404 can be programmed with this information. Thus, the computer 404, through signals from the position sensor 326, can determine indentor travel and knowing the size of the connector, can determine whether a good or bad crimp occurred. Although the tool 2 in the embodiment shown cannot distinguish between connectors made of different materials, suitable means (not shown) could be provided for an operator to inform the tool 2 of the material, such as at the control console 353. Alternately, connectors may be provided with indications for reading by a connector reading device (not shown) in the tool 2. Obviously, any suitable means can be used to inform the controller of the size of the connector. However, in the embodiment shown, the tool 2 is capable of automatically determining or sensing the size of a connector.

In the embodiment shown, the tool 2 generally uses the ram position sensor 326, pressure sensor 31 and the geometry of the head section 12 to sense the size of a connector located between the ram 16 and anvil 15. As stated above, free travel is the movement of the ram 16 from its home position to the connector contact position. The electrical resistance on the resist strip measured by the position sensor 326 as the ram 16 is at the connector contact position is signaled or transmitted to the controller 400. Alternatively, the position sensor could sense the length of free travel rather than location of the ram 16 at the connector contact position. In the embodiment shown, the control 400 uses the electrical resistance measurement to determine the position or location of the ram at the connector contact position from a stored memory of potential resist strip electrical resistance values and corresponding ram locations or its mathematical equivalent. As the ram meets advancement resistance pressure, from the presence of the connector D, pressure in the cylinder 18 increases. In the embodiment shown, the pressure sensor 31 is designed to signal the controller 400 of the occurrence of a predetermined ram advancement resistance pressure. When the hydraulic pressure reaches the predetermined ram advancement resistance, the low pressure plunger 222 is pushed back and triggers the low pressure switch 258 which in turn signals the controller 400 of the occurrence of connector contact. The controller 400, knowing that the predetermined ram advancement resistance pressure or connector contact has been obtained and knowing or having determined the location of the ram, can determine the size of a connector located between the ram 16 and anvil 15 by comparing the sensed information with a stored memory of potential ram positions and corresponding connector sizes, or its mathematical equivalent.

The tool 2, in the embodiment shown, generally uses pressure and/or movement of the ram in order to automatically determine when the deactivation valve assembly 27 should be used to automatically prevent further advancement of the ram 16 and thereby end work travel movement and end the crimp cycle. Generally, connectors of the type that the tool shown in the embodiment are intended to be used with, would produce a bad crimp if an excessive amount of force, such as over 11,000 psi, was applied to them. Similarly, for connectors that could be crimped without producing a bad crimp at a high pressure, such as over 11,000 psi, the tool 2 could be damaged if not specifically designed and constructed for use at relatively high pressures. Therefore, the pressure sensor 31 uses its high pressure sensing capabilities to sense the occurrence of a predetermined high hydraulic pressure and signal the controller 400, through the use of switch 260 being triggered, of the occurrence of the predetermined high pressure.

The occurrence of triggering the high pressure switch 260 may not happen, in the embodiment shown if the ram reaches its maximum allowable work travel, indicated by the top line (the aluminum line) in the graph in FIG. 10 as will be described below. If the hydraulic pressure in the tool does trigger the high pressure switch 260, the controller 400 then performs two tasks. First, it deenergizes the solenoid 63 in the deactivation assembly 27 thereby effectively deactivating high pressure pumping ability of the pump 24 and preventing the pump 24 from increasing hydraulic pressure at the cylinder 18. Second, the controller 400 determines the actual work travel and compares the actual work travel with a stored memory of potential work travels to produce good crimps for that size connector and, thus, determines if the actual work travel produced a good crimp. A signal can then be sent to a counter 414 in the memory 408 that records the occurrence of crimps. If a bad crimp occurred, a signal can also be sent to a second counter 416 in the memory 408 that records the occurrence of bad crimps. In a preferred embodiment of the present invention, the controller is programmed to permanently disable the tool 2, by not allowing the solenoid 63 to become energized, after the occurrence of a predetermined number of bad crimps, such as about twenty-five. However, any suitable number may be provided for. In this preferred embodiment, after permanent disablement only a special reset tool or apparatus such as a diagnostic device 418 (See FIG. 12) at the place of manufacture could be used to reset the tool for future use and, thereby prevent misuse of the tool and potential danger to users. Thus, the tool can automatically end a crimp cycle and prevent a bad crimp from being made due to excessive pressure on a connector. In addition to use as a means for automatically ending a crimp cycle, the pressure sensor 31 and deactivation valve assembly 27 cooperate with the relief/release valve 26 to provide a hydraulic system pressure safety system for relieving hydraulic system pressure. Thus, in the event one of the two safeties might fail, such as either the relief/release valve 26 or the deactivation valve assembly 27 getting stuck, the other safety can prevent damage to the tool.

As discussed above, the triggering of the high pressure switch 260 may not occur if the ram 16 reaches its maximum allowable work travel, corresponding to the top line (the aluminum line) in the graph shown in FIG. 10. Generally, the controller 400 having determined or sensed the connector's size at the connector contact position, can determine, from a stored memory of the maximum allowable work travels for connector sizes, when the ram 16 has reached its maximum allowable work travel for that size connector. Accordingly, the controller 400 can deenergize the solenoid 63 in the deactivation valve assembly 27 upon the ram reaching that location. Thus, a good crimp is produced without risk of the operator further advancing the ram 16 and potentially producing a bad crimp. Hence, the tool 2, in the embodiment shown, can prevent work travel further than the distance symbolized by the top line (the aluminum line) in FIG. 10. The combined features of independent pressure sensitivity and independent ram position sensitivity obviously allow greater flexibility in producing better quality crimps based, not merely upon pressure sensitivity as in previous tools, but also upon the size of a connection. Thus, the tool, in the embodiment shown, can be used on a variety of sizes and types of connectors, produce a better quality of crimps, and produce fewer bad crimps. The present invention can almost always produce a good crimp except for situations such as when an operator intentionally or negligently ends a crimp cycle prior to the end of the full crimp cycle, or when a hard object becomes lodged in the head section, or if defective materials (connectors) are being used. In addition, the pressure and position sensitivity of the embodiment shown can determine if and when bad crimps are made as well as when good crimps are made. In the embodiment shown, the controller, having determined that a bad crimp has been made, can activate the second signal 365 (see FIG. 3) to inform an operator that a bad crimp occurred. Alternatively, the controller 400 could activate the second signal 365 and/or an additional signal to inform an operator that a good crimp occurred. The controller 400 might also be suitably configured or programmed to allow for an emergency release by the operator without recording a bad crimp. For example, if the operator discontinues pumping and releases hydraulic fluid prior to reaching the 100 psi pressure level, no bad crimp is recorded. However, any suitable type of programming can be provided.

Figure 11D:
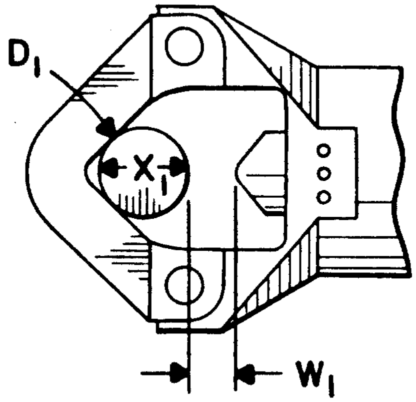
FIG. 11D is a view as in FIG. 11A with a second connector having a relatively smaller size.
Figure 11E:
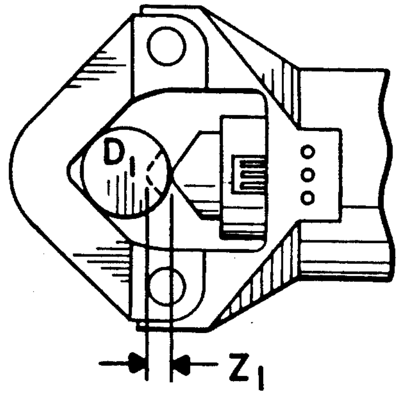
FIG. 11E is a view as in FIG. 11B with a second connector having a relatively smaller size.
Figure 11F:
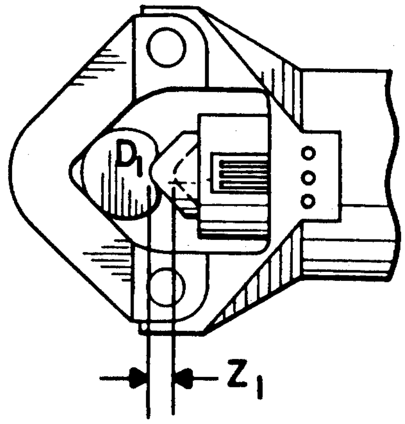
FIG. 11F is a view as in FIG. 11C with a second connector having a relatively smaller size.

Referring to FIGS. 11A–11C and FIGS. 11D–11F, schematic views of the ram 16 and anvil 15 are shown for two different size connectors D and $D_1$, respectively. FIG. 11A shows the connector D having an outer diameter X with the ram 16 in a home position and a distance W between the position of the ram tip 312 and the outer diameter of the connector D. This distance W generally indicates indentor free travel. FIG. 11B shows the ram 16 having been moved the length W to the connector contact position. At this position the controller 400 calculates or determines the size of the connector D (i.e.: that the connector D has an outer diameter X). The controller can then determine or calculate, based upon the connector size, the work travel distance Z (consisting of the distance from the connector contact position to a range of distances between a first work travel distance for an aluminum connector and a second work travel distance for a copper connector). FIG. 11C shows the ram 16 at the end of its work travel having crimped the connector D the distance Z. FIG. 11D shows a second connector $D_1$ which is relatively smaller than the first connector D. The second connector $D_1$ has an outer diameter $X_1$. The ram 16 can be moved the length $W_1$ to the connector contact position. At this position the controller can calculate or determine the size of the connector $D_1$ (i.e.: that the connector $D_1$ has an outer diameter $X_1$). The controller can then determine or calculate, based upon the connector size, the desired work distance generally symbolized by distance $Z_1$ in FIG. 11E. FIG. 11F shows the ram 16 at the end of its work travel wherein the controller prevents further advancement of the ram.

Upon the completion of a crimp, whether a good crimp or a bad crimp, an operator must retract the ram 16 in order to remove the crimped connector. In an alternate embodiment of the present invention, the tool 2 can have a special method or means of signaling the controller 400 that the connector has been removed and that the solenoid 62 in the deactivation valve assembly can be energized such that the tool 2 can be used again.

However, it should be noted that no means are necessary to signal the controller that the connector has been removed and the tool 2 can be further used. In the alternate embodiment, the controller 400 is programmed such that when it deenergizes the deactivation valve assembly solenoid 63 after the occurrence of a good crimp, the controller 400 will only energize the solenoid 63 again upon the operator retracting the ram 16 to its fully retracted home position. The tool 2 can use the position sensor 326 to signal the controller 400 when the ram 16 reaches its home position. The operator would thus use the relief/release valve 26 to release virtually all of the fluid from the cylinder 18; the return spring 320 returning the ram 16 when fluid is removed and pressure is reduced. This feature of the alternate embodiment can also act as a reset to ensure that the ram 16 is returned to its home position before an additional crimping cycle occurs thereby ensuring accurate position sensor readings from the home position. However, return of the ram 16 to its home position after a good crimp need not be required.

In the embodiment shown, the tool 2 comprises a special system and method of discouraging an operator from allowing bad crimps to occur. In the embodiment shown, the controller 400 is programmed such that, if it determines that a bad crimp has occurred, the controller will not only deenergize the solenoid 63, but also prevent use of the tool, at least temporarily, until the operator performs several tasks that act as a reset for the tool. The temporary prevention of use of the tool is accomplished by keeping the solenoid 63 deenergized, thereby preventing high pressure operation of the pump 24. In one type of system, the first step to reset the tool 2, from temporary disablement, is to fully extend the ram 16 to its furthest extension. Obviously, because of the presence of a connector between the ram 16 and anvil 15 and the fact that the controller 400 has effectively inactivated the high pressure operation of the pump 24, an operator must first release fluid from the cylinder 18 thereby retracting the ram to remove the connector from between the ram 16 and the anvil 15 as well as any other obstructions. The operator must then pump fluid back into the cylinder 18 and thereby advance the ram until it reaches its fully extended position. It must be remembered that the pump 24, in the embodiment shown, is not totally inactivated upon deenergization of the solenoid 63, but merely prevented from supplying fluid to the cylinder 18 when the pressure of the hydraulic fluid at the cylinder 18 is higher than the amount of pressure required to move the extension 79 and unseat the plunger 78 in the deactivation valve assembly 27 and open check valve assembly 168. The controller 400 can sense that the ram 16 has reached its fully extended position via the position sensor 326. In one type of alternate embodiment, for a tool that uses dies to compress an article, suitable sensors may be provided to signal the controller 400 that a crimp cycle is complete when the dies touch each other. However, before allowing the solenoid 63 to be energized in the future, the final step to the method is that the ram 16 must be moved back to its home position. Thus, in the event of a bad crimp, only after an operator retracts the ram, removes any obstructions, advances the ram 16 to its fully extended position, and then retracts the ram to its fully retracted home position, can the solenoid 63 be energized in the future and the tool 2 become operational again at high pressure. Obviously, this reset procedure can be burdensome to an operator. Thus, an operator will undoubtedly endeavor to prevent the occurrence of bad crimps and thereby pay closer attention to proper operation of the tool and prevent additional labor and time in order to obtain a good crimp. Alternatively, any suitable type of reset could be used for either bad crimp and/or good crimp situations. In one type of an alternate embodiment, an alternate or additional reset switch may be provided for triggering by the ram 16 at its home position. In addition, no such system and method of discouragement and reset need be provided.

Figure 12:
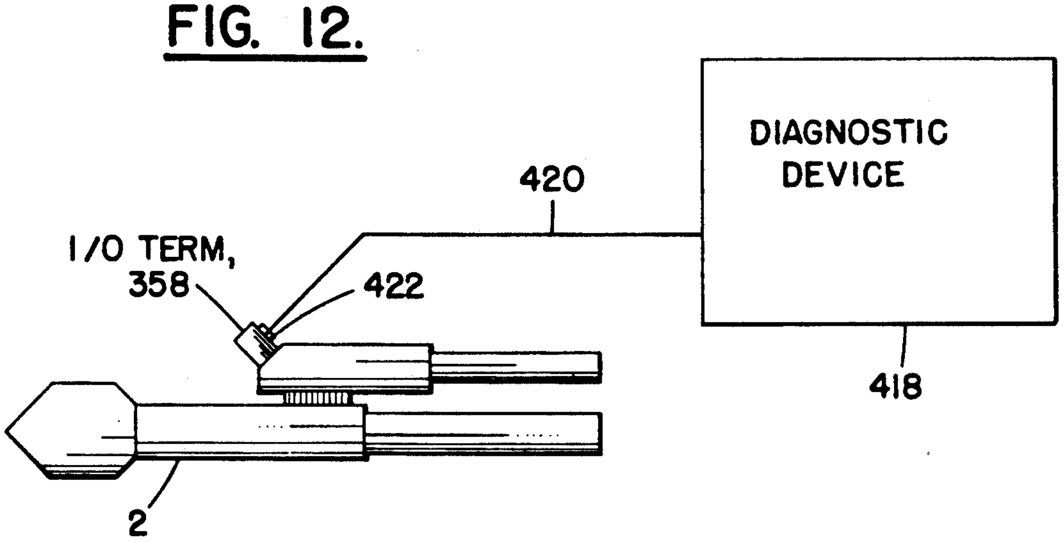
FIG. 12 is a schematic diagram of a system having a diagnostic device.

Referring now also to FIG. 12, there is shown a schematic view of the tool 2 connected to a diagnostic device 418. As described above, the tool 2 has an input/output terminal 358 connected to its controller 400. The diagnostic device 418 has a suitable cable 420 and electrical connector 422 for electrically connecting the diagnostic device 418 to the input/output terminal 358. Thus, the diagnostic device 418 can be suitably connected to the controller 400 for communication therewith. The diagnostic device 418 may be comprised of any suitable computer hardware and computer software for reading information stored in the RAM 412 of the tool 2 and for reading, changing or altering instructions located in the ROM 412. One such diagnostic device may be comprised of a PC computer. However, any suitable type of computer diagnostic equipment can be used.

Figure 13:
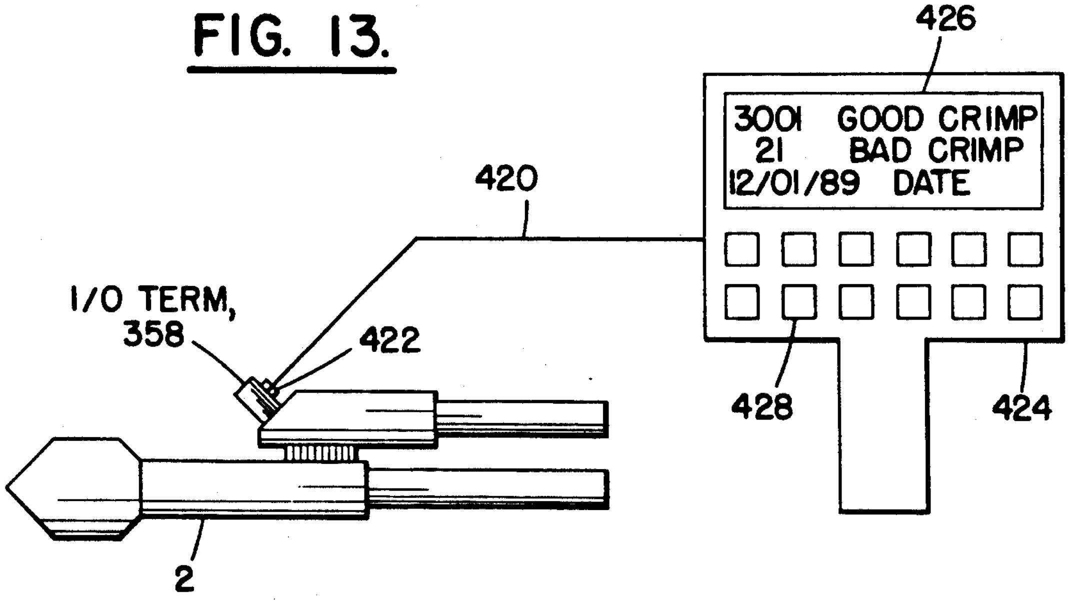
FIG. 13 is a schematic diagram of a system having a hand-held reading device.

FIG. 13 shows an alternate system comprising a hand-held reading device 424 connected to the input/output terminal 358 of tool 2 by cable 420 and connector 422. In the embodiment shown, the hand-held reading device 424 comprises a display window 426, operating keys 428, and a suitable computer (not shown). Generally, the reading device 424 can be used to collect or monitor information regarding use of the tool 2 in the filed. Obviously, any suitable type of hardware and/or software may be provided for monitoring, recording, and/or displaying crimp information such as the number of good crimps, the number of bad crimps, the date when the tool 2 is scheduled to be serviced, or any other suitable information as desired.

Figure 14A:
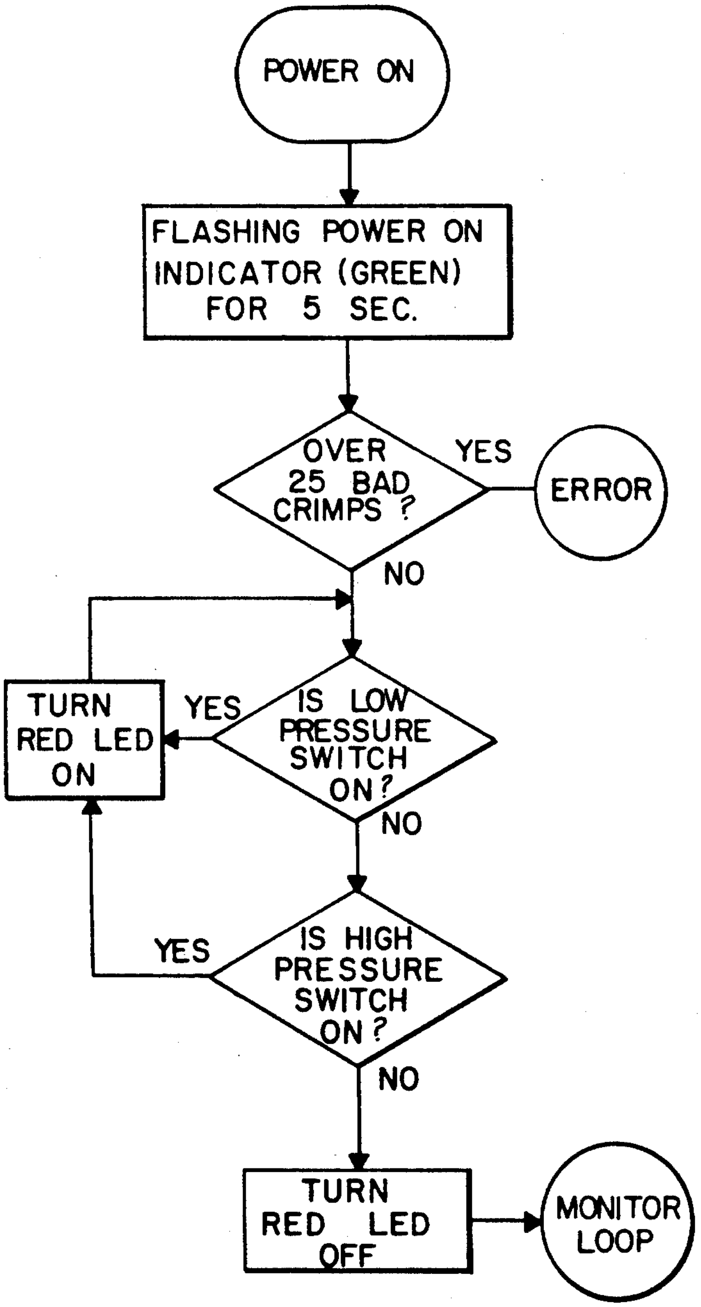
FIG. 14A is a flow chart of an initial start-up sequence of a system having a computer.
Figure 14B:
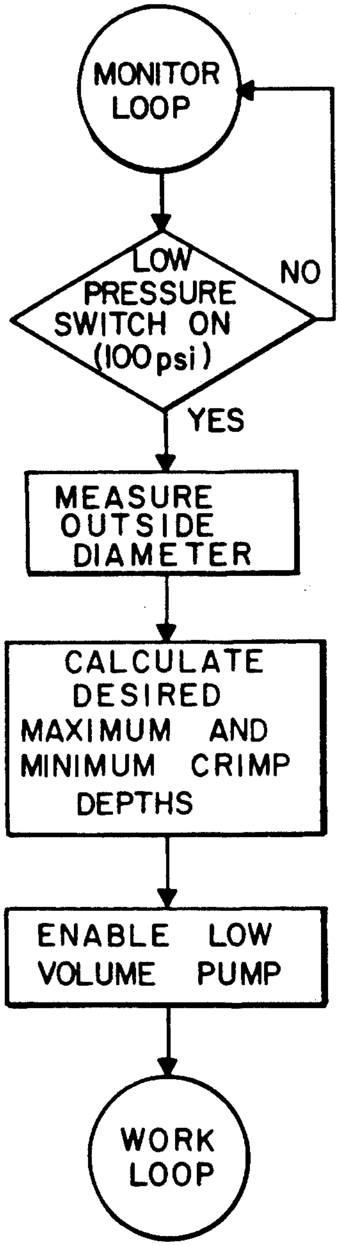
FIG. 14B is a flow chart of a monitor loop corresponding to free travel of a ram with a computer determining work travel distance of a ram and enabling low volume high pressure pumping.
Figure 14C:
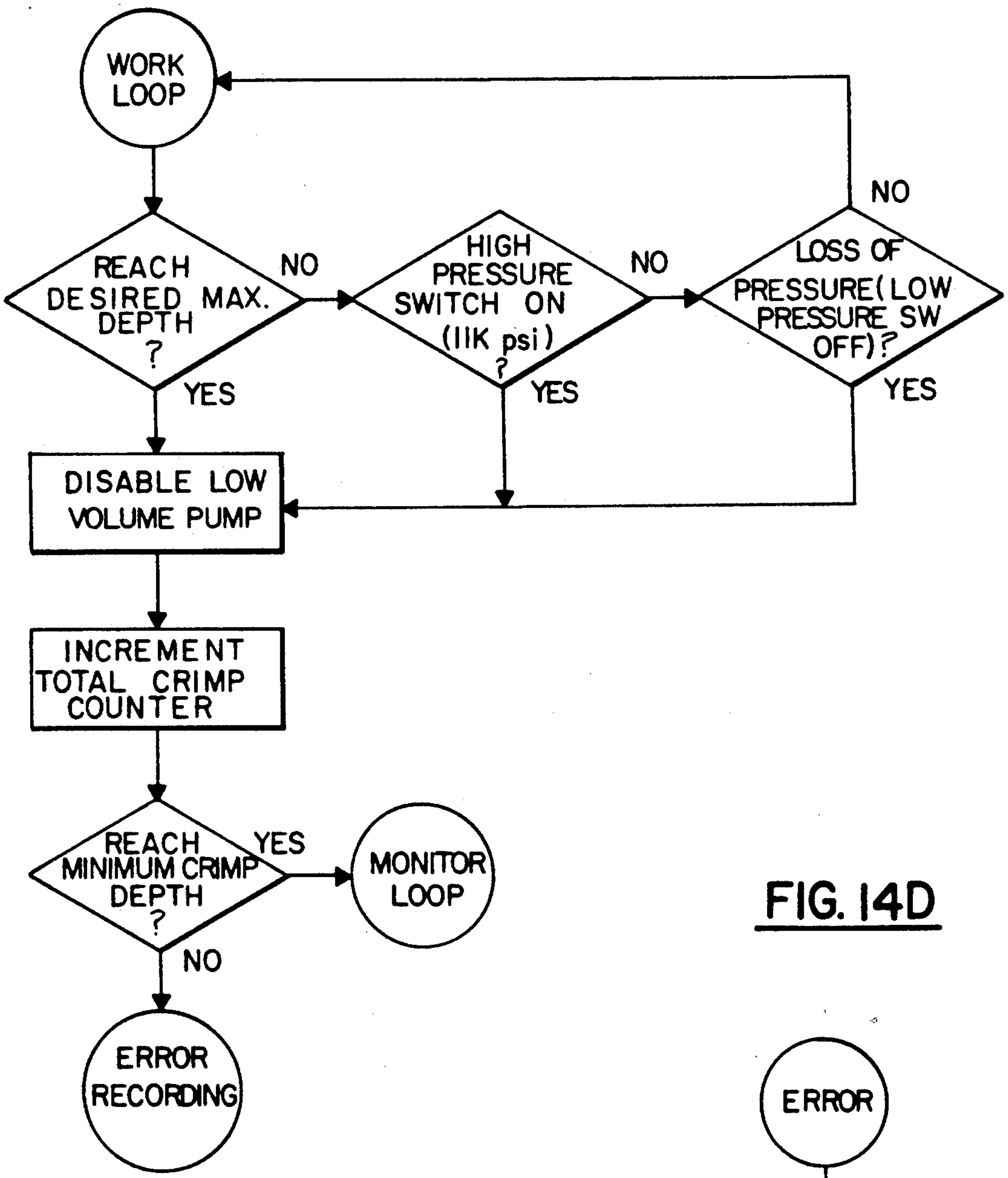
FIG. 14C is a flow chart of a work loop corresponding to work travel of a ram with a computer controlling work travel.
Figure 14D:
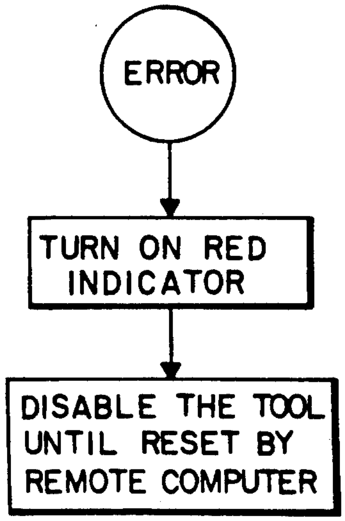
FIG. 14D is a flow chart of an error sequence corresponding to permanent disablement.
Figure 14E:
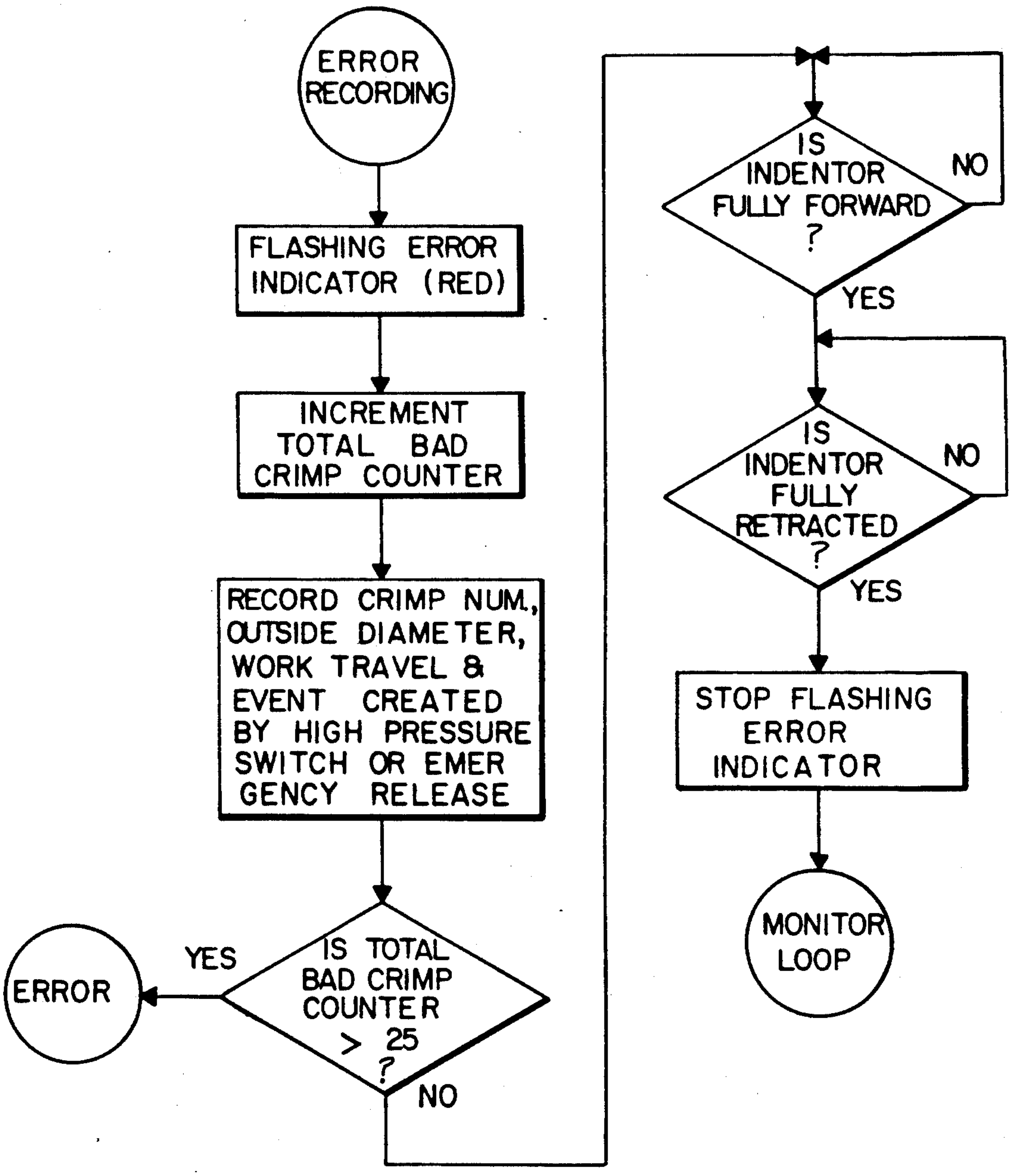
FIG. 14E is a flow chart of an error recording loop.

Referring also to FIGS. 14A, B, C, D, and E, the operation of the tool 2, in one type of system, is shown. The operation can generally commence with an operator pressing the ON/OFF button 368 that signals the controller 400 to "awaken" from a "sleep" state of extremely low power consumption. The "sleep" or OFF state can be reentered by either pressing the ON button 368 or can be automatically reentered by the controller 400 after a period of tool inactivity, such as five minutes. The tool wake up or transition from its OFF state to its ON state is generally indicated by flashing of the third signal 366 by the controller 400 for a period of time, such as five seconds. The transition from the ON state to the OFF state can also be indicated by the signals 364 through 366 if desired, such as by signaling a single flash of two of the signals at the onset of the OFF mode. As stated above, in the embodiment shown, the computer 404 has a bad crimp counter 416. The computer 404 checks the number of bad crimps recorded in the bad crimp counter 416. If the number of bad crimps counted by the counter 416 is over 25, then the signals 364 through 366 can be used to indicate that the tool 2 is permanently disabled, such as by a steady signal from the second signal 365 (see Error sequence in FIG. 14D). The computer 404 keeps the solenoid 62 deenergized, such as in the OFF state, to thereby disable high pressure use of the tool and force the return of the tool to a service location for reset, such as by use of the diagnostic device 418. If the bad crimp counter 416 has a stored count of less than or equal to 25 bad crimps, the computer 404 next checks to see if the tool 2 is pressurized. In other words, the computer 404 checks to make sure that both the high pressure switch 260 and low pressure switch 258 at the pressure sensor 31 are off. If the tool 2 is pressurized at this point, the computer 404 will turn on the second signal 365 and keep high pressure capabilities of the tool disabled, at least temporarily, by failing to energize the solenoid 62 in the deactivation assembly 27 until the operator depressurizes the system via valve 26 such that the computer 404 receives signals from the pressure sensor 31 that an unpressurized condition is now present in the tool. The tool 2 can of course use the signals 364 through 366 in the control panel 353 to signal an operator that the tool is disabled or any other suitable signals can be used including audio signals. Once the computer 404 recognizes that an unpressurized condition exists, the computer 404 will enter a monitor loop as shown in FIG. 14B, at which time the tool is substantially ready to start a crimp. Generally, while the computer 404 is in the monitor loop, the computer monitors the pressure sensor 31 for an abrupt pressure rise which would indicate that the ram 16 had contacted a connector. During free travel of the ram 16, the computer 404 has been programmed such that the operator can reset the tool with the manually operated relief/release valve 26 with no consequences. Upon sensing the connector contact position, the computer 404 calculates the connector's outer diameter as a function of the tools geometry and the electrical resistance measured at the position sensor 326. The computer 404 next calculates the "desired" crimp depth (similar to the information shown as the top line in FIG. 10) and "minimum acceptable" crimp depth (similar to the information shown as the bottom line in FIG. 10) for work travel based upon information or data stored in the memory 408. In an alternate embodiment of the present invention, the controller 404 can energize the solenoid 62 at the awakening of the tool from its OFF state to its ON state. The controller 400 generally remains in the work loop until the "desired" crimp depth is obtained, or hydraulic pressure reaches a predetermined high level, such as about 10,500 psi, or hydraulic pressure becomes less than a predetermined low level, such as about 95 psi. When any of these three conditions occur, the controller 400 can deenergize the solenoid 62 thereby disabling the low volume high pressure pumping action of the pump and preventing further ram advancement. The total crimp counter 414 can then be incremented. The actual crimp depth for indentor travel is then compared to the calculated minimum allowable crimp depth for that size connector. If the crimp depth or work travel exceeds the calculated minimum allowable crimp depth, the crimp is considered to be a good crimp in which case the controller 400 can return to the top of the work loop, at which time the tool is ready to start another crimp. If the minimum allowable crimp depth is not achieved, the tool transitions to the error recording sequence shown in FIG. 14E. During this error recording sequence, the controller 400 causes the control panel 353 to indicate a bad crimp, such as by flashing the second signal 365, and increments the bad crimp counter 416. If the bad crimp counter 416 indicates a total number of bad crimps as being less than or equal to 25, the controller 400 can record the current bad crimp data (such as crimp number, connector outer diameter, crimp depth, and reason for exiting the work loop, i.e.: the hydraulic pressure exceeded 10,500 psi or drop below 95 psi) in the memory 408. If the contents of the bad crimp counter 416 are less than or equal to 25, the controller 400 will not reenter the monitor loop until the operator has pumped the ram 16 to its fully forward extended position and then fully retracts the ram to its home position such that the tool 2 gives the operator unmistakable feedback that the last crimp was a bad crimp. If the number of bad crimps in the bad crimp counter is greater than 25, then the controller 400 transitions to the error loop shown in FIG. 14D, at which time the control panel 353 indicates that the tool is permanently disabled, such as by changing the flashing second signal 365 to a continuous signal, and the controller prevents further high pressure use of the tool 2 to thereby force an operator to return the tool to a service location for reset.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. An apparatus for crimping an article, the apparatus having a frame, a movable indentor, and means for moving said indentor, the apparatus further comprising:

means for sensing the location of the indentor relative to said frame;

means for automatically determining a range of movement of said indentor for producing a good crimp, said determination being dependent, at least partially, upon the size of an article to be crimped; and means for preventing further advancement of said indentor upon the occurrence of said indentor reaching an end of said range, wherein said means for preventing further advancement of said indentor includes a computer controlled hydraulic system deactivation valve, whereby a bad crimp is prevented from occurring.

2. An apparatus as in claim 1 wherein said means for sensing movement of said indentor comprises an electronic position sensor.

3. An apparatus as in claim 1 wherein said means for automatically determining a range of movement includes a computer comprised of a microprocessor and a memory.

4. An apparatus as in claim 3 wherein means said microprocessor can compare data stored in said memory to data sensed at said means for sensing for signaling said means for preventing further advancement of said indentor.

5. An apparatus as in claim 1 further comprising a hydraulic system relief/release valve.

6. An apparatus as in claim 1 further comprising means for determining the size of an article to be crimped.

7. An apparatus for crimping an article, the apparatus having a frame, a movable indentor, means for moving said indentor including a hydraulic system, and an indentor movement control, said control comprising:

means for automatically determining a bad crimp including means for sensing the location of said indentor and means for sensing hydraulic pressure in said hydraulic system; and means for preventing further advancement of said indentor upon the occurrence of a predetermined hydraulic system pressure before the occurrence of movement of said indentor to a predetermined location, said means for preventing including a computer connected to said means for sensing hydraulic pressure and means for disabling said hydraulic system from increasing pressure in said hydraulic system, said means for disabling being connected to said computer and controlled thereby.

8. An apparatus for crimping an article, the apparatus having a frame, a movable indentor, means for moving said indentor including a hydraulic system, and an indentor movement control, said control comprising:

means for sensing the location of said indentor;

means for automatically determining a minimum distance of indentor movement for producing a good crimp, said determination being dependent, at least partially, upon the size of an article to the crimped;

means for sensing hydraulic pressure in said hydraulic system; and means for preventing further advancement of said indentor upon the occurrence of a predetermined hydraulic system pressure before the occurrence of said indentor reaching said minimum distance of indentor movement.

9. An apparatus as in claim 8 wherein said control comprises a computer having a microprocessor and a memory.

10. An apparatus as in claim 9 wherein said microprocessor can compare information from said means for sensing the location of said indentor and said means for sensing hydraulic system pressure to data stored in said memory for signaling said means for preventing further advancement of said indentor upon the occurrence of a predetermined hydraulic system pressure before the occurrence of said indentor reaching said minimum distance.

11. An apparatus as in claim 8 further comprising means for determining the size of an article to be crimped.

12. An apparatus as in claim 8 further comprising means for signaling an operator of the occurrence of a bad crimp.

13. An apparatus as in claim 8 further comprising means for disabling the apparatus after a predetermined number or sequence of bad crimps.

14. An apparatus as in claim 9 wherein said means for preventing comprises a computer controlled deactivation valve.

15. An apparatus for crimping an article, the apparatus comprising:

means for crimping including a movable interior advancable towards an article from a retracted home position;

means for disabling crimping action of said means for crimping upon occurrence of a predetermined condition until said means for crimping is reset; and means for resetting said means for crimping after said occurrence, said means for resetting being activated by substantially full retraction of said indentor to said home position.

16. An apparatus as in claim 15 wherein said means for crimping includes a hydraulic drive system for moving said indentor and, said means for disabling includes a deactivation valve connected to said hydraulic system, said deactivation valve disabling said hydraulic system upon occurrence of said predetermined condition and said means for resetting can reset said deactivation valve and thereby enabling said hydraulic system.

17. An apparatus as in claim 15 wherein said means for disabling and said means for resetting includes a computer.

18. An apparatus as in claim 15 further comprising means for disabling the apparatus upon the occurrence of a predetermined number or sequence of predetermined conditions.

19. An apparatus as in claim 18 wherein the apparatus can only be enabled for further use after disablement upon resetting said means for disabling the apparatus by means of a reset apparatus.

20. An apparatus for crimping an article, the apparatus comprising:

means for crimping having a movable indentor, a hydraulic system, and two handles for pumping the hydraulic system; and a hydraulic system pressure safety system having a least two means for relieving hydraulic system pressure, a first means for relieving hydraulic system pressure comprising a computer and a computer controlled deactivation valve, and a second means for relieving hydraulic system pressure comprising a mechanical relief valve.

21. An apparatus as in claim 20 wherein said first means for relieving hydraulic system pressure includes a hydraulic system pressure sensor connected to said computer.

22. An apparatus as in claim 20 wherein said computer is connected to a solenoid that can, at least partially, control said deactivation valve.

23. An apparatus for crimping an article, the apparatus comprising:

means for crimping having a movable indentor, a hydraulic system, and two handles movable relative to each other for hydraulically moving said indentor; and means for relieving hydraulic fluid from said hydraulic system upon the occurrence of a predetermined hydraulic system pressure, said means for relieving comprising a computer and a computer controlled hydraulic system deactivation valve.

24. An apparatus as in claim 23 wherein said means for relieving hydraulic system pressure includes a computer controlled solenoid for, at least partially, controlling said deactivation valve.

25. An apparatus as in claim 23 wherein said means for relieving hydraulic system pressure includes a hydraulic system pressure sensor.

26. An apparatus for crimping an article, the apparatus having a frame, a movable indentor, means for moving said indentor, and an indentor travel controller, the controller comprising:

means for sensing the location of said indentor relative to said frame;

means for sensing free travel movement of said indentor;

means for automatically determining length of work travel movement of said indentor based upon sensed free travel movement to produce a good crimp of the article; and means for preventing further advancement of said indentor upon the occurrence of said indentor reaching an end of said length of work travel movement.

27. An apparatus as in 26 wherein said controller further comprising a second means for preventing further advancement of said indentor, said second means being activated upon the occurrence of a predetermined hydraulic pressure in a hydraulic drive system of the apparatus, said second means for preventing including an electronic hydraulic pressure sensor.

28. An apparatus as in claim 27 wherein said controller comprises means for resetting said controller upon activation of said means for preventing further advancement.

29. An apparatus as in claim 28 wherein the apparatus includes a hydraulic relief/release valve.

30. A method of controlling crimping of an article comprising the steps of:

sensing the location of an indentor;

sensing hydraulic pressure in a hydraulic drive system for moving the indentor;

determining deactivation parameters for preventing further crimping by the indentor including a deactivation location of the indentor to produce a good crimp of the article and a deactivation pressure in the hydraulic drive system to produce a good crimp of the article; and activating a deactivation valve to prevent further advancement of the indentor upon the occurrence of the indentor reaching the deactivation location or the hydraulic system reaching the deactivation pressure.

* * * * *